US011520742B2

(12) United States Patent
Nishimoto et al.

(10) Patent No.: US 11,520,742 B2
(45) Date of Patent: Dec. 6, 2022

(54) DATA MESH PARALLEL FILE SYSTEM CACHING

(71) Applicant: CLOUDBRINK, INC., Sunnyvale, CA (US)

(72) Inventors: Michael Yoshito Nishimoto, Saratoga, CA (US); Saravanan Purushothaman, Santa Clara, CA (US); Vinay Gaonkar, San Jose, CA (US); Ramanand Thattai Narayanan, Dublin, CA (US)

(73) Assignee: CLOUDBRINK, INC., Sunnyvale, CA (US)

( * ) Notice: Subject to any disclaimer, the term of this patent is extended or adjusted under 35 U.S.C. 154(b) by 295 days.

(21) Appl. No.: 16/568,093

(22) Filed: Sep. 11, 2019

(65) Prior Publication Data

US 2020/0201819 A1 Jun. 25, 2020

Related U.S. Application Data

(60) Provisional application No. 62/784,658, filed on Dec. 24, 2018.

(51) Int. Cl.
| | |
|---|---|
| *G06F 16/172* | (2019.01) |
| *G06F 16/178* | (2019.01) |
| *G06F 16/18* | (2019.01) |
| *G06F 16/182* | (2019.01) |
| *G06F 16/176* | (2019.01) |

(52) U.S. Cl.
CPC .......... *G06F 16/172* (2019.01); *G06F 16/178* (2019.01); *G06F 16/1774* (2019.01); *G06F 16/183* (2019.01); *G06F 16/1858* (2019.01)

(58) Field of Classification Search
CPC .. G06F 16/172; G06F 16/183; G06F 16/1774; G06F 16/178; G06F 16/1858
See application file for complete search history.

(56) References Cited

U.S. PATENT DOCUMENTS

| | | |
|---|---|---|
| 5,513,314 A | 4/1996 | Kandasamy et al. |
| 7,487,228 B1 | 2/2009 | Preslan et al. |
| 9,015,123 B1 | 4/2015 | Mathew et al. |
| 9,122,700 B2 | 9/2015 | Grider et al. |
| 9,213,717 B1 | 12/2015 | Pawar et al. |
| 9,477,682 B1 | 10/2016 | Bent et al. |
| 9,495,478 B2 | 11/2016 | Hendrickson et al. |
| 2002/0059309 A1 | 5/2002 | Loy et al. |
| 2010/0169887 A1 | 7/2010 | Waas |
| 2011/0320403 A1 | 12/2011 | O'Krafka et al. |
| 2012/0005154 A1* | 1/2012 | George ................ G06F 16/273 707/607 |
| 2012/0016854 A1 | 1/2012 | Kano et al. |

(Continued)

*Primary Examiner* — Cam Y T Truong
(74) *Attorney, Agent, or Firm* — Invoke

(57) ABSTRACT

Embodiments relate to providing a multi-cloud, multi-region, parallel file system cluster service with caching between file system storage nodes. In some embodiments, a first file system storage node of a file system storage cluster receives a request from a client device to access data of a first file system. In response to the request to access the data, a plurality of servers of the first file system storage node pulls, in parallel, the data and nearby data of the data from a second file system storage node of the file system storage cluster. The plurality of servers stores the data and nearby data in the first file system, and provide the data and nearby data to the client device.

30 Claims, 16 Drawing Sheets

(56) References Cited

U.S. PATENT DOCUMENTS

| | | | |
|---|---|---|---|
| 2013/0019067 A1 | 1/2013 | Vilayannur et al. | |
| 2013/0145105 A1 | 6/2013 | Sawicki et al. | |
| 2013/0159364 A1 | 6/2013 | Grider et al. | |
| 2013/0282799 A1* | 10/2013 | Kodama | H04L 67/10 709/203 |
| 2014/0074790 A1* | 3/2014 | Berman | G06F 11/1448 707/649 |
| 2014/0172791 A1* | 6/2014 | Lasky | G06F 16/178 707/624 |
| 2014/0337848 A1 | 11/2014 | Llamas et al. | |
| 2014/0379767 A1 | 12/2014 | Halevy et al. | |
| 2015/0074089 A1* | 3/2015 | Ippili | G06F 16/156 707/722 |
| 2016/0065663 A1* | 3/2016 | Yang | H04L 67/1008 709/219 |
| 2017/0097941 A1 | 4/2017 | Graves et al. | |
| 2017/0147451 A1* | 5/2017 | Iwasaki | G06F 11/1469 |
| 2017/0289238 A1* | 10/2017 | Corrao | G06F 3/061 |
| 2018/0024865 A1 | 1/2018 | Saga | |
| 2018/0285263 A1 | 10/2018 | Ghazaleh | |
| 2018/0288154 A1 | 10/2018 | Ghazaleh | |
| 2019/0095287 A1* | 3/2019 | Vijayan | G06F 11/1451 |
| 2019/0147085 A1* | 5/2019 | Pal | G06F 16/24535 707/718 |
| 2021/0110062 A1* | 4/2021 | Oliner | G06F 16/2477 |

* cited by examiner

1400

Receive, by a first file system storage node of a file system storage cluster, a request from a client device to access data of a first file system
1405

In response to the request to access the data, pull the data and nearby data of the data from a second file system storage node of the file system storage cluster
1410

Store the data and the nearby data in the first file system
1415

Provide the data and the nearby data to the client device
1420

Receive, by a first file system storage node of a file system storage cluster, a request from a client device to write data to a first file system stored on the first file system storage node
1505

↓

In response to the request to write the data to the first file system, write the data to the first file system
1510

↓

Send instructions to a second file system storage node of the file system storage cluster for writing the data to a second file system stored on the second file system storage node
1515

↓

Write the data to the second file system based on the instructions
1520

FIG. 15

DATA MESH PARALLEL FILE SYSTEM CACHING

CROSS REFERENCE TO RELATED APPLICATIONS

This application claims the benefit of Provisional Application No. 62/784,658, filed Dec. 24, 2018, which is incorporated by reference in its entirety.

BACKGROUND

This invention relates generally to file systems and specifically relates to a parallel file system cluster service.

A centralized file system can provide data to client devices over a network, such as the Internet, from a single location. However, this type of file system architecture creates difficulties when serving a large number of client devices in different geographical regions. For example, a slow network connection or large geographical distance can result in longer access times. In another example, a large number of connected client devices can cause network congestion or computing bottlenecks at the file system.

SUMMARY

Embodiments relate to providing a multi-cloud, multi-region, parallel file system cluster service with caching between file system storage nodes. Some embodiments include a method. The method includes: receiving, by a first file system storage node of a file system storage cluster, a request from a client device to access data of a first file system; in response to the request to access the data, pulling, by a plurality of servers of the first file system storage node in parallel, the data and nearby data of the data from a second file system storage node of the file system storage cluster; storing, by the plurality of servers of the first file system storage node in parallel, the data and the nearby data in the first file system; and providing, by the plurality of servers of the first file system storage node, the data and the nearby data to the client device.

Some embodiments include a system. The system includes a first file system storage node, and a second file system storage node connected to the first file system storage node. The first file system storage node includes a plurality of servers configured to: receive a request from a client device to access data of a first file system; in response to the request to access the data, pull in parallel the data and nearby data of the data from the second file system storage node; store in parallel the data and the nearby data in the first file system; and provide the data and the nearby data to the client device.

BRIEF DESCRIPTION OF THE DRAWINGS

FIG. 14 shows a flow chart of a method of data caching between file system storage nodes, in accordance with some embodiments.

FIG. 15 shows a flow chart of a method of data synchronization between file system storage nodes, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
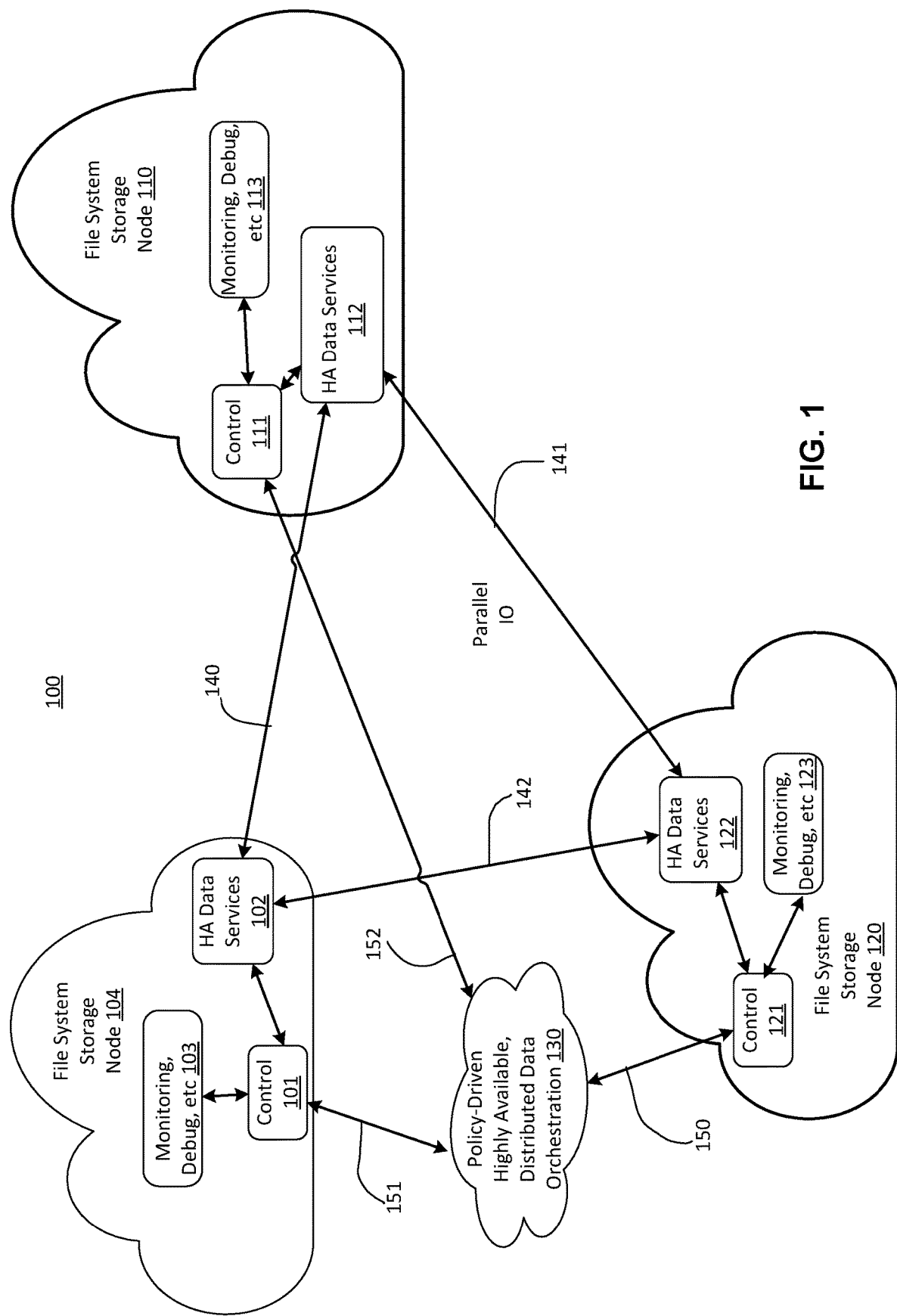
FIG. 1 shows a file system storage cluster, in accordance with some embodiments.

FIG. 1 shows a file system storage cluster 100, in accordance with some embodiments. The file system storage cluster provides a data mesh parallel file system that implements a multi-cloud, multi-region, parallel file system cluster service which has a loosely coupled, global namespace and performs policy-driven data orchestration. Multi-region implies operating over wide area networks, such as the Internet. The system 100 includes a cluster of multiple (e.g., regional) file system storage nodes 104, 110, 120 (also referred to as "cluster nodes" or "nodes") that are connected over a network, such as a wide area network. Each cluster node is made up of multiple hardware and software components. In some embodiments, each cluster node 104, 110, and 120 includes multiple servers that may operate in a parallel. The file system storage cluster 100 may include more or fewer nodes.

The nodes 104, 110, 120 can perform storage operations on selected parts of the namespace even if one node of the total cluster, say 104, decouples from the other nodes, 110, 120. As such, the system implements a loosely-coupled, global namespace that can operate even if one or more nodes become decoupled. For example, the data services in node 104 (e.g., a cloud provider) can separate from the node 120 (e.g., an on-prem node) and node 110 (e.g., another cloud provider), and some or all of the data services can still continue. In some embodiments, the nodes 110 and 120 may be in different regions. One advantage to such a design is that some applications can continue operating in the presence of network connection failures to other parts of the total cluster 100. Policy-driven data orchestration can synchronize and strategically locate data or data copies to reduce weaknesses of multi-region/multi-cloud topologies and to take advantage of local IO latencies.

Each node 104, 110, and 120 may include a high availability (HA) data service module ("HA Data Services") 102, 112, and 122, a control module ("Control," also referred to as "node controller") 101, 111, and 121, and a monitoring module ("Monitoring, Debug, etc") 103, 113, and 123. The data service modules and control modules in FIG. 1 are shown as single objects, but they may be implemented as highly available services. The cloud providers can be different vendors having different and similar services. As such, the system 100 provides a single data mesh parallel file system service that can span multiple vendors as well as multiple physical regions in the world.

Each of the control modules 101, 111, 121 is driven and configured by a (e.g., single) highly available, policy-driven data orchestration service 130 over a network including connections 150, 151, 152. The control modules may connect to the closest orchestration service they can find. The control modules understand how to configure the data service module and their services at each cloud region and collect data from the cloud regions. The data services modules communicate between each other over a network including connections 140, 141, 142 to provide global data mesh parallel file system services, thus implementing the loosely coupled, global namespace. The monitoring module of a node tracks the operation of the other components of the node and facilitates debugging and resource recovery. The file system and non-file system data moving between nodes is referred to herein as a dataflow.

Rule Based Data Orchestration

Figure 2:
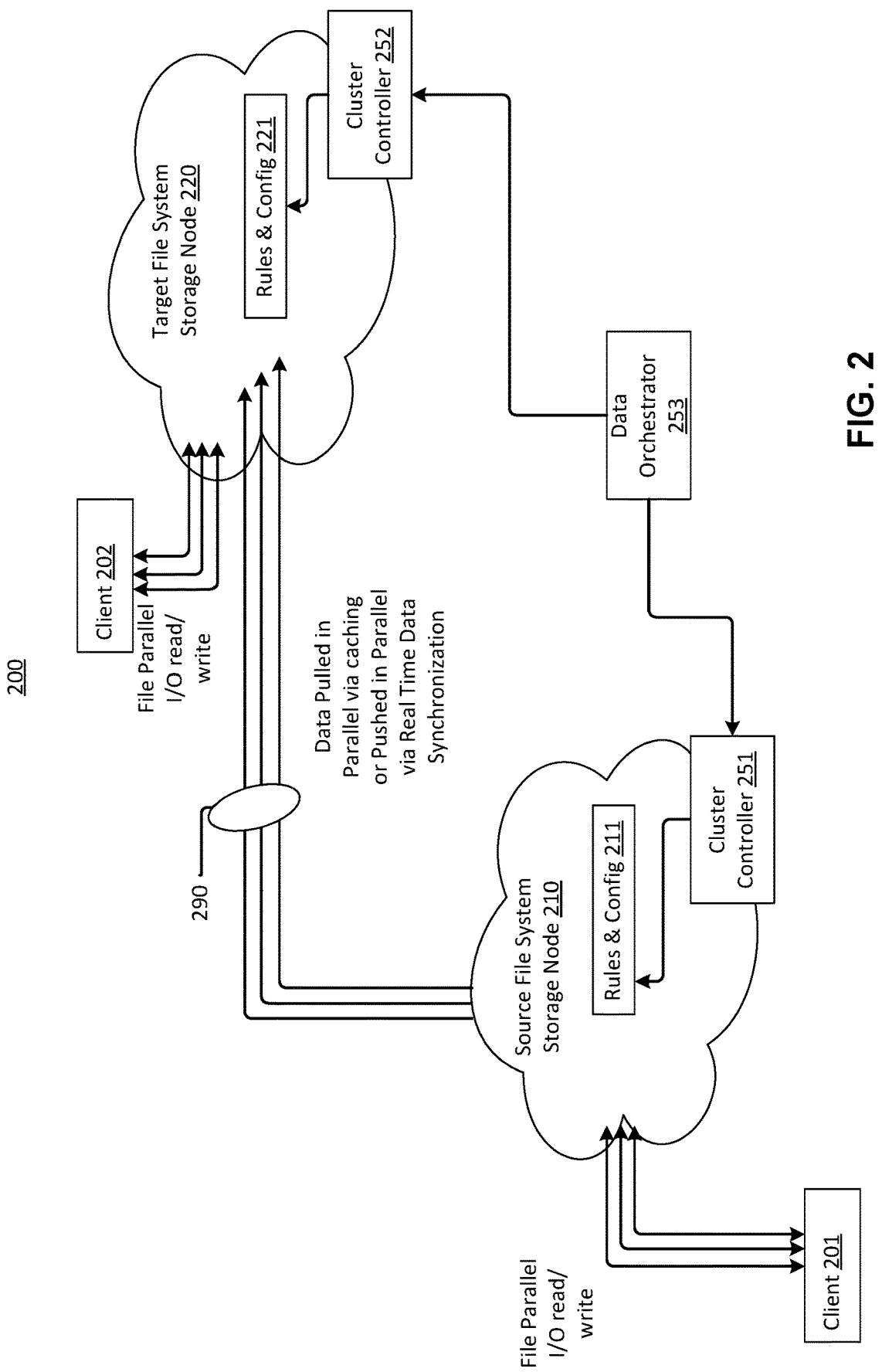
FIG. 2 shows a file system storage cluster, in accordance with some embodiments.

FIG. 2 shows a file system storage cluster 200, in accordance with some embodiments. The cluster 200 provides a data mesh parallel file system including a rule-based data orchestration architecture. The system 200 performs multiple simultaneous data flow movements, parallel real-time data (including metadata and content data) replication, parallel data caching, and analytically driven data preloading. The system 200 includes a source file system storage node 210 and a target file system storage node 220 which form a data mesh parallel file system. The nodes 210 and 220 are connected to each other over a network 290, which may include a WAN. The node 210 includes a node controller 251, and the node 220 includes a node controller 252. The node controllers 251 and 252 are each connected, such as via the network 290, to a data orchestrator node 253 (or "data orchestrator"). The node 210 is connected to a client 201 to provide a file system service to the client 201. The node 220 is connected to a client 202 to provide the file system service to the client 202.

The data orchestrator 253 is configured with policies, such as by an administrator. The data orchestrator 253 provides a service for configuring the data flow movements, replication, caching, and other operations of the system.

The data orchestrator 253 converts the policies to rules and configuration information 211/221, and pushes the rules and configuration information 211 to node controller 251 of node 210 and the rules and configuration information 221 to node controller 252 of node 220. The node controllers 251 and 252 may be stateless node controllers.

The node controller 251 provides (e.g., pushes) the rules and configuration information 211 to node 210, and the node 210 stores the information 211. The node controller 252 provides the rules and configuration information 221 to node 220, and the node 220 stores the information 221. The rules and configuration information 211/221 program the node 210/node 220 with specific instructions on how to treat existing and new data in each node. For example, the rules and configuration information of a node may program the data service module of the node to perform replication or caching with one or more other nodes.

Data Replication

The system 200 may implement a parallel data replication data flow across multiple nodes, such as parallel real-time data replication. In a data replication, updates to a first file system stored at one node are replicated to a second file system stored at another node. For example, the node 210 may act as a source and the node 220 may act as a target for the data replication. The data (e.g., including metadata and/or content data) replication from the node 210 to the node 220 may be specified by the rules and configuration information 211 stored at the node 210 and the rules and configuration information 221 stored at the node 220, as specified by the policies from the data orchestrator 253.

In an example of data replication, the client 201 parallelly writes data D2 for File F at address AD for block length L bytes into node 210 File F already had data D1 at address AD for block length L bytes, so the data write was an overwrite.

The data D2 is also parallelly replicated in real time across network 290 to the node 220 based on the rules and configuration information 211 stored at the node 210.

The client 202 attempts to parallelly read File F at address AD for block length L bytes in the node 220. If the client 202 attempts to parallelly read the File F at address AD for block length L bytes in the node 220 after the replication of the data D2 has completed, the client 202 receives the data D2 from the node 220. If the replication of the data D2 has not started when the client 202 attempts to read the File F, the client 202 parallelly receives the data D1 from the node 220. The data D1 is stored in the node 220 prior to the replication of the data D2. For example, the data D1 may have been previously replicated from the node 210 to the node 220, or from the node 220 to the node 210.

In a synchronous replication, if the replication of the data D2 has started but not completed when the client 202 attempts to read the File F, the node 220 waits until the replication of the data D2 is complete before sending the data D2 parallelly to the client 202. For example, the data D2 may have reached the node 220 from the node 210 via the network 290, but the replication of the data D2 in the node 220 may not have completed. Here, the network 290 and the node 220 are operating properly for communication with the node 210, and thus the node 220 is aware of the replication and sends the data D2 to the client 202 when the replication has completed.

In an asynchronous replication, if the replication of the data D2 has started but not reached the node 220 when the client 202 attempts to read the File F, the node 220 sends the data D1 to the client 202. The data D2 from the node 210 may fail to reach the node 220, for example, if the network 290 has a failure resulting in the node 210 being disconnected from the node 220. The node 220 may not be aware of the replication being initiated at the node 210, and thus provides the existing data D1 to the client 202. The node 210 may continue attempting to complete the replication and transfer of the data D2 to the node 220. When the data D2 reaches the node 220, the node 220 sends the data D2 to the client 202. The client 202 may need to wait until the replication of the data D2 is complete before receiving data D2 parallelly.

Data Caching

The system 200 may implement a parallel caching data flow across multiple nodes. For example, the node 210 may act as a source and the node 220 may act as a target for the caching. With parallel data caching, an application can start on a target node before all required application data has been transferred to the target node. As more data is needed by the target node application, the required data is pulled from the source data node. The caching from the node 210 to the node 220 may be specified by the rules and configuration information 211 stored at the node 210 and the rules and configuration information 221 stored at the node 220, as specified by the policies from the data orchestrator 253. For example, the data orchestrator 253 may control whether data written to one node is replicated or cached with respect to one or more other nodes, and instruct each of the nodes accordingly.

The client 201 parallelly writes the data D2 for File F at address AD for block length L bytes into node 210. File F already had data D1 at address AD for block length L bytes, so the data write was an overwrite.

The data D2 is on node 210, but not automatically replicated to the node 220 when the data D2 is written at the node 210.

If the client 202 parallelly reads the File F at Address AD for block length L on the Node 220, the node 220 reaches across the network 290 to the node 210 and parallelly pulls the requested data into the node 220. If the write data from the client 201 to the node 210 is complete, the client 202 will parallelly receive the data D2. If the write data from the client 201 to the node 210 has not started, the client 202 will parallelly receive the data D1. If the write data from the client 201 to the node 210 has started but not completed, the client 202 will wait until the write of data D2 on the node 220 is complete before it parallelly receives the data D2.

Data Preloading

The system 200 may implement an analytically driven preloading data flow across multiple nodes. Analytically driven preloading is a process where the data mesh parallel file system determines the most advantageous parts of data from a data source (e.g., a working set) to preload into a data target. Data is loaded either into the target cache or target storage or both, depending on the data flow policy. Preloading allows applications running on the data target to execute faster than if the same applications only executed with a caching data flow. The data mesh parallel file system may use read patterns on the data source to determine the preload working set. This preloading action typically operates in conjunction with the parallel caching. Since the preloading of the working set consumes the same bandwidth between node A and node B as the caching data transfers, priority must be assigned to various data transfers. For the most effective use of a fixed data transfer pipe, the caching data may take priority over the working set replication data transfers.

For example, the node 210 may act as a source and the node 220 may act as a target for the preloading operation. The preloading operation from the node 210 to the node 220 may be specified by the rules and configuration information 211 stored at the node 210 and the rules and configuration information 221 stored at the node 220, as specified by the policies from the data orchestrator 253. For example, the data orchestrator 253 may control whether data written to one node is replicated or cached or preloaded with caching or preloaded with caching and replication with respect to one or more other nodes, and instruct each of the nodes accordingly.

Data D4 exists on node 210 and is large. An application AP, running on client 201, parallelly reads data from D4 during the last execution.

In this example, the data mesh parallel file system analytic engine determines that there are two data regions in D4 which are beneficial to pre-cache to node 220, namely D1 (address AD1 for length L1) and D2 (address AD2 for length L2). These two regions become the pre-cache working set W.

Before application AP executes on node 220 with a caching data flow between node 210 and node 220, the data mesh parallel file system can preload the working set W to node 220. Depending on the data flow policy, W is loaded into node B's cache or storage or both.

Now the application AP can execute through client 202 on node 220, using caching functionality to pull missing data from the data source node 210 to the data target node 220.

Depending on the data flow, the data mesh parallel file system can start replicating with the caching functionality to slowly pull larger data sets to the target node 220.

Distributed Locking Across Geographically Dispersed Data

In a geographically distributed, real-time data mesh parallel file system cluster, where data is dispersed and applications perform simultaneous updates to the same block within the same object or file, a consistency algorithm may be used to keep data synchronized. For example, an optimization to a global locking, consistency protocol that reduces data traffic transferred between cluster regional nodes may be used when simultaneous updates occur to the same data (metadata or content data).

Figure 3:
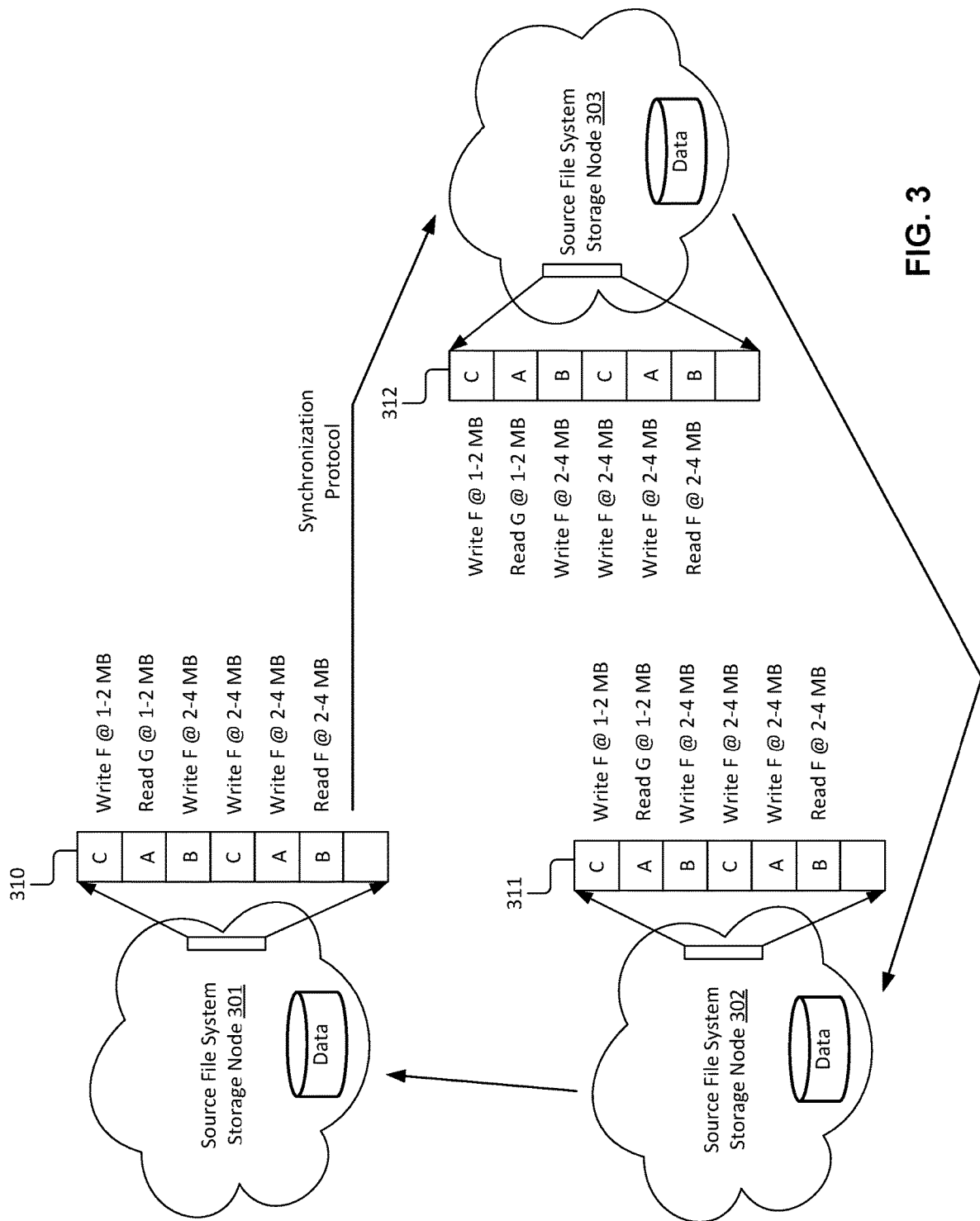
FIG. 3 shows an example of distributed locking for data stored on different file system storage nodes, in accordance with some embodiments.

FIG. 3 shows an example of distributed locking for data stored on different file system storage nodes, in accordance with some embodiments. Within a distributed, parallel file system cluster data mesh like that depicted in FIG. 3, there will be times when applications running in multiple nodes (e.g., at different regions) attempt to update the same content data (e.g., file or object) at the same time. When this happens, systems need some mechanism to determine what content data will exist in the file or object after accepting all the simultaneous updates.

In one solution to this problem, a global virtual queue, modeled with real queues 310, 311, 312, is maintained in each node 301, 302, and 303. A global locking mechanism, possibly two-phase commit, ensures the queues in each node are identical. The queue holds entries corresponding to operations on specific files which are issued within nodes in the data mesh. Entries hold file operational information and no content data, and operations within the data mesh are performed in queue order. For example, if a write operation is performed for a file F at offset O for length L, the file operational information would be (1) file F (2) offset O (3) length L. We explain a mechanism where we can skip operations because the results would be the same whether operations are skipped or issued.

With reference to FIG. 3, a File F exists and is stored on all nodes 301, 302, and 303. The following write operations are performed: at time interval 1, an application in node 303 writes 1 MB of data to File F at offset 1 MB. At time interval 2, an application in node 301 reads 1 MB of data from File G at offset 1 MB. Simultaneously, the following writes occur: (a) node 301 writes 2 MB of data to File F at offset 2 MB, (b) node 302 writes 2 MB of data to File F at offset 2 MB, and (c) node 303 writes 2 MB of data to File F at offset 2 MB. At time interval 3, an application in node 302 reads 2 MB of data from File F at offset 2 MB.

At the time interval 3, all three nodes 301, 302, and 303 simultaneously write to the same file F offset; but the synchronized queue forces an order. In this case the order is B, then C, then A. Operations within the data mesh parallel file system are performed in queue order. Write operations may be defined by a global write lock. Read operations may be defined by a global read lock. After performing operations in time interval 1 and time interval 2, the data mesh parallel file system can squash the 3 simultaneous operations in time interval 3. Depending on the policy, either the first write in the time interval can be taken or the last write in the time interval can be taken. The time interval is bounded by the arrival of an operation in time interval 4, even if the operation (c) discussed above does not get added to the queue at the same exact time as the operations (a) and (b).

File System Storage Node Parallel Reading and Writing

The parallel file system at each node splits up workload, so that many processors, usually on different servers, can operate on file system operations or inputs/outputs (IOs) coming from different clients in parallel. The parallel file system also splits up large IOs from a single client and return/accept the large IOs to/from multiple processes on different servers. In this way, the parallel file system can parallelize operations and obtain a scale-out architecture, by adding more metadata stack servers and content data stack servers. Each node of data mesh parallel file system cluster of nodes may include a parallel file system architecture.

Figure 4:
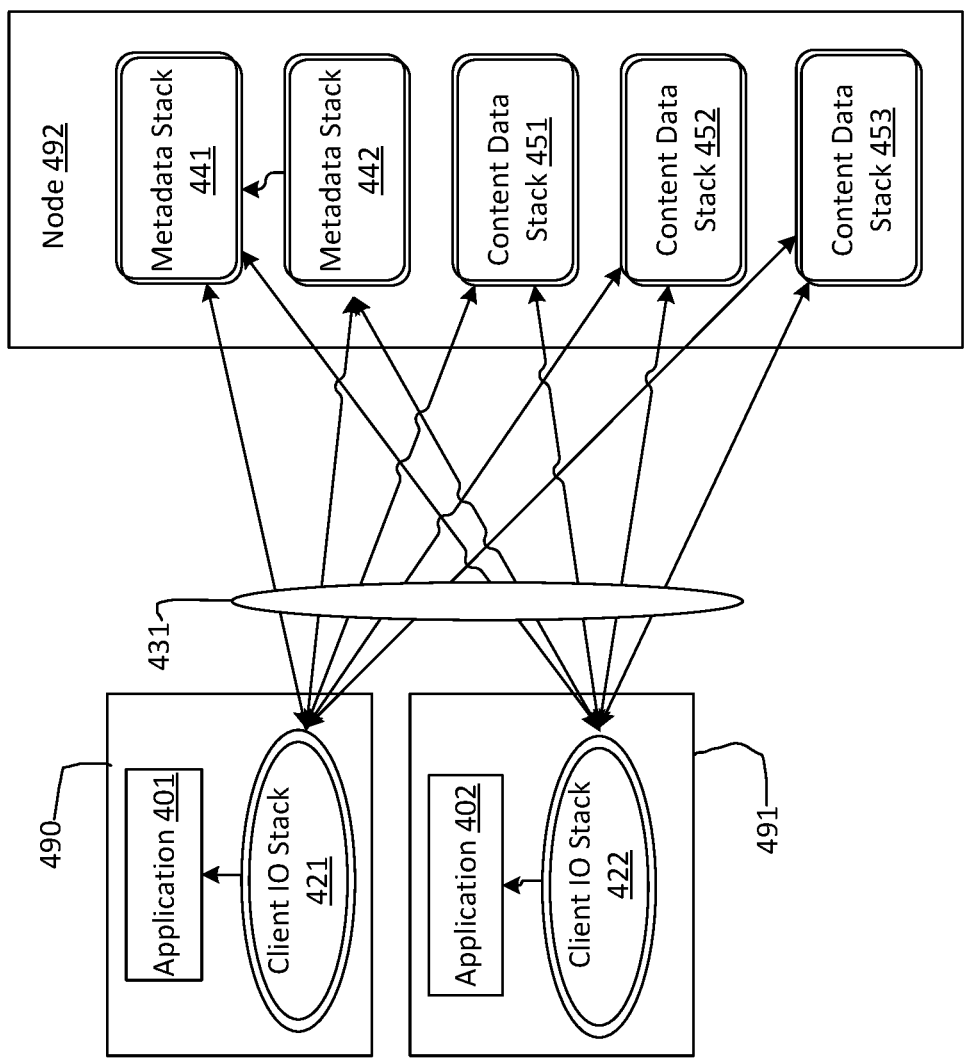
FIG. 4 shows a file system storage node, in accordance with some embodiments.

FIG. 4 shows a file system storage node 492, in accordance with some embodiments. The file system storage node 492 is connected to one or more client devices, such as client devices 490 and 491. Each file system storage node of a file system storage cluster may operate independently to provide a data of a file system to client devices. Application 401 and client IO stack 421 co-exist in a client device 490. Application 402 and client IO stack 422 co-exist in a client device 491. Client IO stacks perform file system operations on behalf of applications and understand the topology of the file system storage node. Applications 401 and 402 send file system operations (e.g., metadata and content data updates) through client IO stacks 421 and 422, respectively. The client II stacks 421 and 422 are connected to the cluster node 492, via a local area network or wide area network interconnect 431, and provide independent IOs to the parallel file system of the cluster node. The cluster node 492 may include metadata stacks 441, 442 and content data stacks 451, 452, 453 that perform file operations (e.g., read, write, timestamp update, replication write/update operation, caching read IO, etc.), based on the IOs received from the client II stacks 421, 422. The file system storage node 492 may include one or more servers. A server may include a physical device or a virtual machine. In some embodiments, each metadata stack and each content data stack is a separate server.

For example, the node 492 includes two metadata stacks 441 and 442, which may be implemented on two compute & storage servers. The node 492 further include three content data stacks 451, 452, and 453, which may be implemented on three compute & storage servers. Each of the stacks 441, 442, 451, 452, and 453 may include unique storage hardware devices. The number of metadata stacks and content data stacks in a file system storage node may vary.

The content data stripe size in this example is 3 MiB which means a 3 MiB write, starting at address 0, will span all three content data stacks 451, 452, 453 such that the first 1 MiB of 3 MiB is written to the content data stack 451, the second 1 MiB of 3 MiB is written to the content data stack 452, and the third 1 MiB of 3 MiB is written to the content data stack 453.

To perform a file system operation such as a read or a write to a file, the client IO stack 421 sends event calls to the node including an open file call to open the file, a read or write file call to perform the read or write, and a close file call to close the file. The event calls may include metadata event calls to a metadata stack and data event calls to a content data stack. For a file system operation, an initial open file call is sent to a metadata stack, such as the metadata stack 441. The metadata stack 441 may determine which of the metadata stacks of the node (e.g., metadata stack 441 or 442) handle all subsequent metadata operations for the specific file, and provides the metadata stack that handles the subsequent metadata operations for the file to the client IO stack 421. The metadata stacks 441 and 442 are interconnected in order to solve multi-file operations, like file rename.

Parallel Read

The client IO stack 421 wants to perform a 2 MiB read of File A from address offset 1 MiB. File A is 100 MiB in length. In this case, the operations are as follows:

1. The application 401 sends an open File A call to the client IO stack 421.
2. The client IO stack 421 sends an open file call to the metadata stack 441 of the node via a path 431.
3. The metadata stack 441 tells client IO stack 421 to use the metadata stack 442 for subsequent metadata calls for the File A, and that the address space for File A is spread over the content data stacks 451, 452 and 453. For example, the content data stack 451 is assigned to addresses 0-1 MiB, 3-4 MiB, and so on. The content data stack 452 is assigned addresses 1-2 MiB, 4-5 MiB, and so on. The content data stack 453 is assigned addresses 2-3 MiB, 5-6 MiB, and so on.
4. The client IO stack 421 replies to application 401 for the open call and returns a file descriptor for File A.
5. The application 401 sends one 2 MiB read request to the client IO stack 421.
6. The client IO stack 421 sends two parallel read file calls to the content data stacks 452 and 453 based on the address space for File A.
    a. Content data stack 452: Ask for File A address 1-2 MiB
    b. Content data stack 453: Ask for File A address 2-3 MiB
7. The content data stacks 452 and 453 send replies to the client IO stack 421 in parallel with the requested read data. The client IO stack 421 serializes the read data, and sends the serialized read data back to the application 401.
8. The application 401 sends a close File A request to the client IO stack 421.
9. The client IO stack 421 sends a close file call to the metadata stack 442 to close the File A after the read of File A is completed.
10. The metadata stack 442 replies to client IO stack 421 for the close call, and the client IO stack 421 replies to application 401 for the close call.

Parallel Caching Read

The client IO stack 421 wants to perform a 2 MiB read of File A from address offset 1 MiB; however, unlike the parallel read case discussed above, File A exists on another cluster node. File A is 100 MiB in length Caching parallel read operations are split up just like non-caching reads. However, when metadata or data is not available in the cache (cache-miss), metadata and content data stacks must send event calls to another node to retrieve the required metadata or data. The other node may be in a different region. For example, in Parallel Read step 6, content data stacks 452 and 453 send cache-miss read events in parallel to their counterparts in their companion node, chosen during data flow setup. Data replies from the companion node are processed in parallel and returned to client IO stack 421.

Parallel Write

The client IO stack 421 wants to perform a 2 MiB write of File A to address offset 1 MiB. File A is 100 MiB in length. In this case, the operations are as follows:
1. The application 401 sends an open File A call to the client IO stack 421.
2. The client IO stack 421 sends an open file call to the metadata stack 441 of the node via a path 431.
3. The metadata stack 441 tells client IO stack 421 to use the metadata stack 442 for subsequent calls for the File A, and that the address space for File A is spread over the content data stacks 451, 452 and 453. For example, the content data stack 451 is assigned to addresses 0-1 MiB, 3-4 MiB, and so on. The content data stack 452 is assigned addresses 1-2 MiB, 4-5 MiB, and so on. The content data stack 453 is assigned addresses 2-3 MiB, 5-6 MiB, and so on.
4. The client IO stack 421 replies to application 401 for the open and returns a file descriptor for File A.
5. The application 401 sends a request to write 2 MiB to the client IO stack 421.
6. The client IO stack 421 sends two parallel write calls to the content data stacks 452 and 453 based on the address space for File A.
   a. Content data stack 452: Data for File A address 1-2 MiB
   b. Content data stack 453: Data for File A address 2-3 MiB
7. The content data stacks 452 and 453 write the received data in parallel to the file system of the node.
8. The content data stacks 452 and 453 send write replies to the client IO stack 421 in parallel, confirming that the writes are successful.
9. The client IO stack 421 sends a single reply to the application 401 based on the replies sent from the content data stacks.
10. The application 401 sends a close operation to client IO stack 421 who then sends the operation to metadata stack 442.
11. The metadata stack 442 replies to client IO stack 421 for the close call for File A, and the client IO stack 421 replies to application 401 for the close call.

Parallel Replication Write

The client IO stack 421 wants to perform a 2 MiB write of replicated File A to address offset 1 MiB. File A is 100 MiB in length.

Replication write operations are split up just like non-replicated writes. However, in addition to writing data or performing a metadata operation in the local regional node, the data is replicated to another node or metadata operation also performed in another node. The other node may be in a different region over a wide area network. For example, in step 6 of the parallel write discussion above, the data written to content data stacks 452 and 453 may also be written parallelly to another node which may be in a different region. The node receiving the replication is chosen when this replication data flow is set up. Data replies from the companion node are processed in parallel and returned to client IO stack 421.

Redundant Data for High Availability

Figure 5:
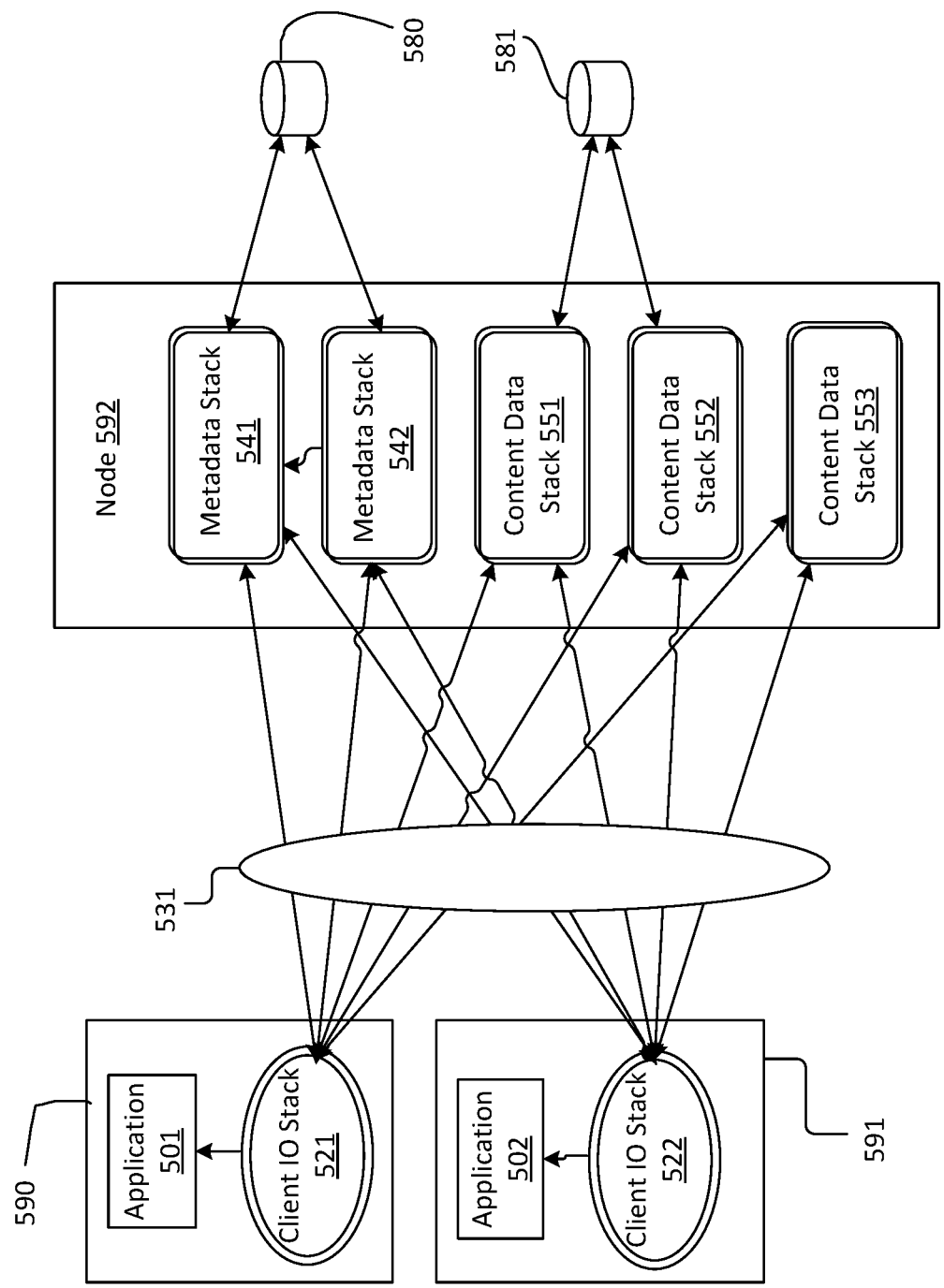
FIG. 5 shows a file system storage node, in accordance with some embodiments.

FIG. 5 shows a file system storage node 592, in accordance with some embodiments. Metadata and content data may be stored in some redundant fashion to protect against component failures, such as to hardware or software systems. With multiple metadata stacks 541 and 542 (and possibly more) and multiple content data stacks 551, 552, and 553 (and possibly more), individual content data or metadata fragments can be replicated across multiple stacks of the same type.

The stacks may use multi-ported storages 580 and 581, where each storage 580 and 581 includes multiple connections to multiple stacks. For example, the data (content data and metadata) stored in the storage 581 is accessible to both the content data stack 551 and content data stack 552. As such, the content data stack 551 may operate in place of the content data stack 552 when the content data stack 552 has a failure, and the content data stack 552 may operate in place of the content data stack 551 when the content data stack 551 has a failure. In another example, the metadata stored in the storage 580 is accessible to both the metadata stack 541 and metadata stack 542. As such, the metadata stack 541 may operate in place of the data metadata stack 542 when the metadata stack 542 has a failure, and the metadata stack 542 may operate in place of the metadata stack 541 when the metadata stack 541 has a failure. This multi-ported storage functionality can also be implemented with independent network-based replication to functionally mimic a hardware-based multi-ported storage device.

The stacks may use erasure coding, where the metadata or content data are separated into fragments and stored across different storages. The storage devices for data may be accessed by the multiple data stacks, and the storages for the metadata may be accessed by multiple metadata stacks.

Parallel Caching Between Two Nodes

Given two file system storage nodes, all data (metadata and content data) may initially exist on the first cluster parallel file system storage node. If an application needs to access some of the data to run but can only do so by accessing the second cluster parallel file system, the application may need to wait for a long time for all the data to be copied to the second cluster parallel file system node from the first cluster parallel file system. Presented here is a solution which allows the application to start immediately even if all the data required by the application is not present on the second cluster parallel file system storage node.

To solve the problem just mentioned in a high performance method, the second cluster parallel file system node an application can receive metadata and content data in parallel from the first cluster parallel file system as requests are performed to the second cluster parallel file system. To further increase performance, metadata and content data transfers can be performed in a bulk manner and not just for the individual piece of data requested.

Caching data transfers will not fill up the entire network data pipeline between the two cluster nodes, so to enhance application startup times further, the additional network data pipeline bandwidth can be filled with pre-calculated working set data. This pre-calculated working set data would have been calculated from a previous execution run on the source node and will be pushed from the source to target node via replication technology, discussed in "Synchronization" sections. Caching data transfers must always take priority over synchronization working set data, and synchronization working set data.

Figure 11:
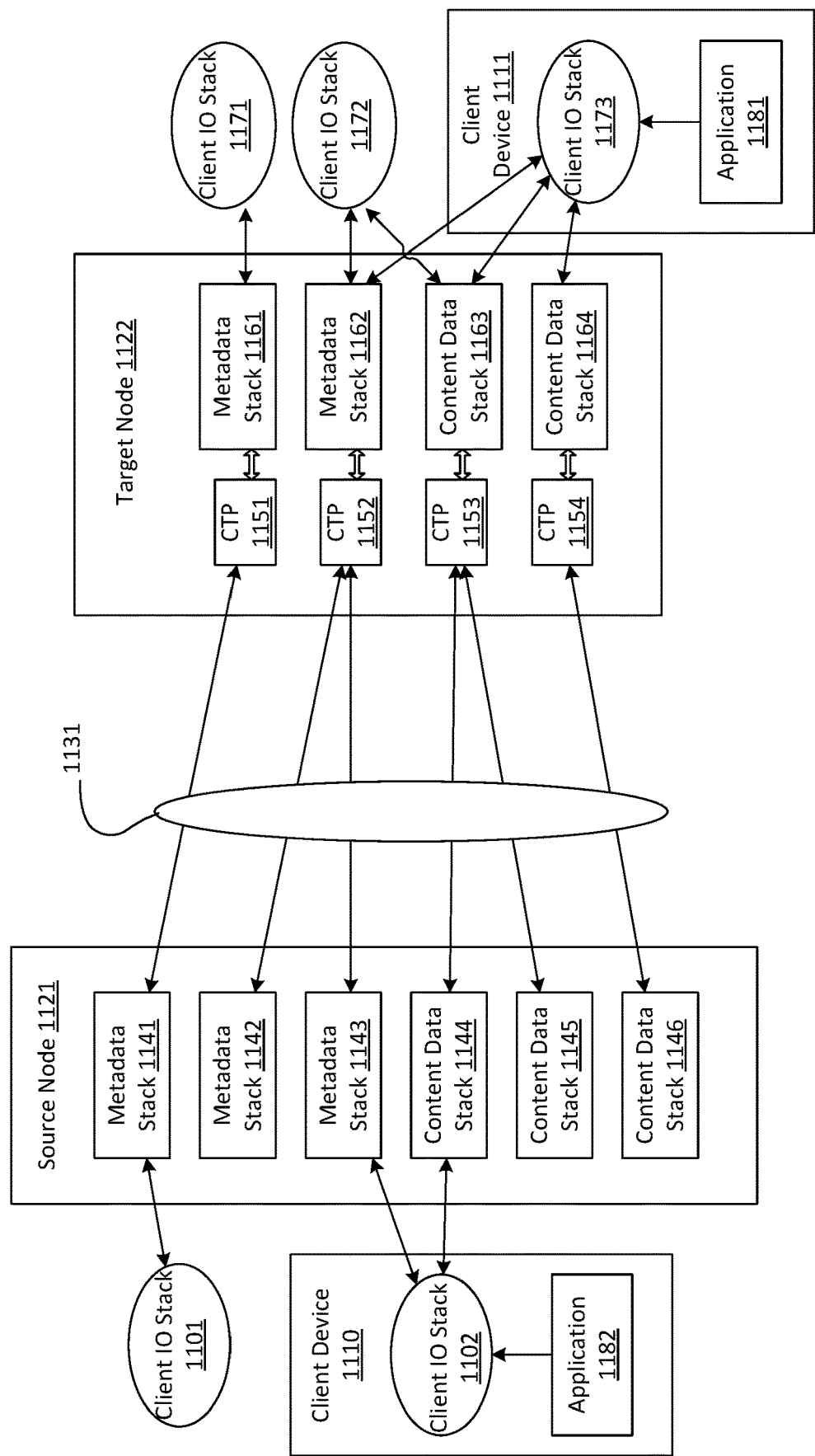
FIG. 11 shows caching of data between file system storage nodes, in accordance with some embodiments.

FIG. 11 shows caching of data between file system storage nodes 1121 and 1122, in accordance with some embodiments. Metadata and content data initially exist only on source node 1121. An application 1182 in client device 1110 can access data on source node 1121 through client IO stack 1102. Client IO stacks contain both control software which can react to both input parameters and local state and storage devices which can store information persistently. The metadata exists in metadata stacks 1141, 1142, 1143, 1161, 1162. The content data exists in content data stacks 1144, 1145, 1146, 1163, 1164. The stacks 1141, 1142, 1143, 1144, 1145, 1146, 1161, 1162, 1163, 1164 contain both storage devices which can store information persistently and processes which can perform control functions based on input parameters and local state.

For application 1181 on client device 1111 which requires similar data as that used by application 1182 to execute properly, application 1181 must have access to the same data which application 1181 accessed on source node 1121.

Application 1181 is connected to target node 1122 through client IO stack 1173. Application 1181 first attempts to access file F's metadata through the metadata stack 1162. File F does not exist in 1162, so metadata stack 1162 must reach out through client thread pool 1152 and through the local area network/wide area network 1131 to metadata stack 1143. When file F's metadata is pulled from metadata stack 1143, other nearby metadata is also pulled and returned with the same reply. Metadata from other files may also be retrieved if the information is not returned in the same reply as file F's metadata. The lines passing through interconnect 1131 represent connectivity between client thread pools 1151, 1152, 1153, 1154 and metadata stacks 1141, 1142, 1143 and content data stacks 1144, 1145, 1146. The connectivity is such that any single client thread pool, such as 1151, can connect to any metadata stack 1141, 1142, 1143 and any content data stack 1144, 1145, 1146. All possible connections are not depicted in FIG. 11.

Once file F's metadata is retrieved and given to application 1181, application 1181 can begin reading content data D1 from file F. To do this, application 1181 attempts to access the required content data D1 through client IO stack 1173 to content data stacks 1163 or 1164. Client IO stack 1173 knows which content data stack should contain content data D1. Say content data stack 1163 is accessed but the data D1 is not present. In this condition, content data stack 1163 reaches through client thread pool 1153 and through WAN/LAN 1131 to content data stack 1144, 1145, 1146 in Source Node 1121. Client thread pool 1153 knows which of the content data stacks contains data D1. When content data D1 is retrieved, other content data may be requested by thread pool 1153. Other content data may be retrieved from different content data stacks. The process of retrieving extra content data is described in FIG. 13.

Figure 12:
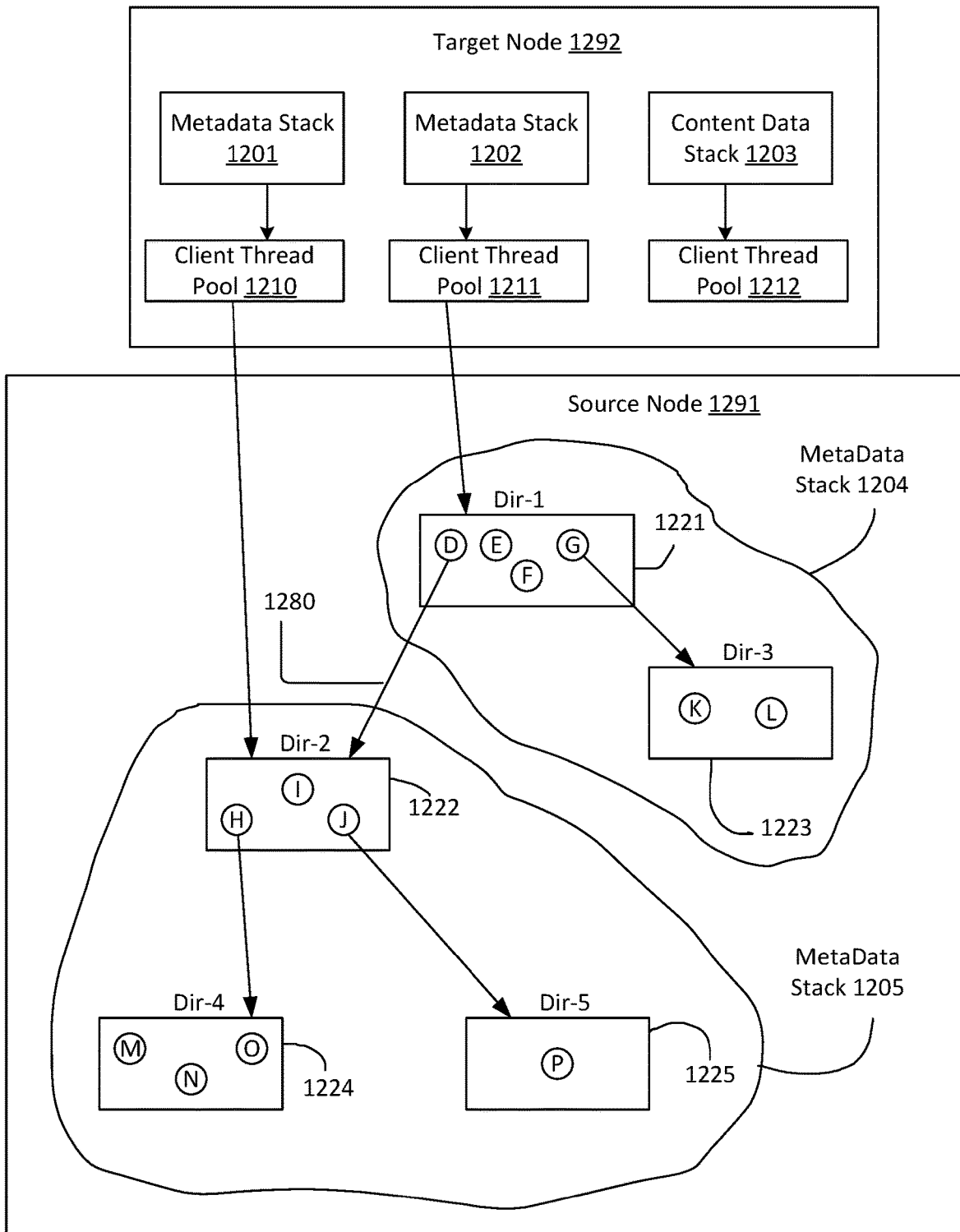
FIG. 12 shows caching of metadata between file system storage nodes, in accordance with some embodiments.

FIG. 12 shows caching of metadata between file system storage nodes 1291 and 1292, in accordance with some embodiments. The source node 1121 of FIG. 11 corresponds with the source node 1291 of FIG. 12 and the target node 1122 corresponds with the target node 1292 of FIG. 12. The LAN/WAN 1131 of FIG. 11 is not shown in FIG. 12. Source node 1291 initially contains metadata and content data for many files. When a metadata request is made to cluster target node 1292, a metadata stack 1201, 1202 will attempt to satisfy the request. If the specific metadata is not present, the respective metadata stack will reach out through a client thread pool to attempt retrieval from a metadata stack on cluster source node 1291.

Assume file F's metadata is in directory Dir-1 1221 which is contained in metadata stack 1204. When file F's metadata is retrieved from source node 1291 and copied to target node 1292, the thread pool process 1211 may also retrieve metadata for all objects (D, E, F, G) in directory Dir-1 1221. When client thread pool 1211 retrieves the metadata for directory object D in Dir-1, process 1211 may follow the link 1280 to Dir-2 1222 and then retrieve the metadata for all objects in Dir-2 1222 (H, I, J). In this example, Dir-2 1222 resides in a different metadata stack 1205 than Dir-1 1221 which resides in metadata stack 1204. If any of the client thread pools 1210, 1211 corresponding to metadata stacks 1201, 1202, need to access a file in dir-2 1222 directly, the client thread can perform a lookup directly from dir-2 1222. If thread pool process 1211 retrieves all metadata for 2 directory levels, starting from Dir-1, 111 would retrieve metadata for all objects in Dir-1 1221, Dir-2 1222, and Dir-3 1223. This fetch ahead is performed because once one object's metadata is requested other nearby object metadata will also be requested very soon.

Figure 13:
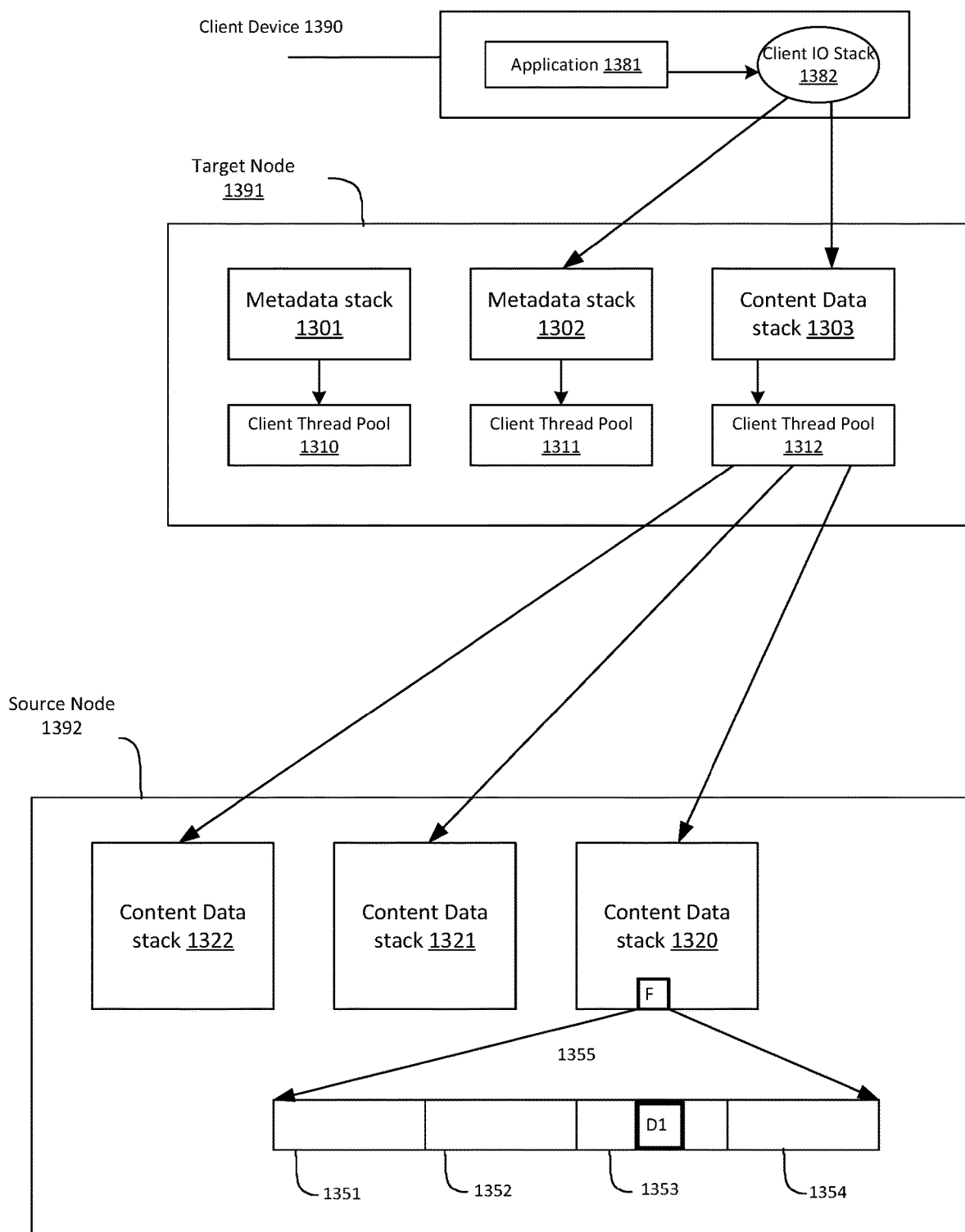
FIG. 13 shows caching of content data between file system storage nodes, in accordance with some embodiments.

FIG. 13 shows caching of content data between file system storage nodes 1391 and 1392, in accordance with some embodiments. The application 1381 has received metadata for file F (e.g., as shown from FIG. 12) and now reads content data D1 from file F through client IO stack 1382 to content data stack 1303. If file F's content data D1 is not present in content data stack 1303, a process 1303 will reach out through client thread pool 1312 to content data stack 1320 in source node 1392. The minimum requirement to satisfy the request for application 1381 is to return content data D1 1355 from the source node 1392. To increase efficiency and performance of the retrieval mechanism, client thread pool 1312 may request all of block 1353 where content data D1 resides. To further increase performance of the system, client thread pool 1312 may retrieve and copy block D1 1353 and blocks nearby block D1. These other blocks may reside in content data stack 1320 but may also reside in other content data stacks 1321, 1322.

Reverse Synchronization to Prior Version of File System

Figure 6:
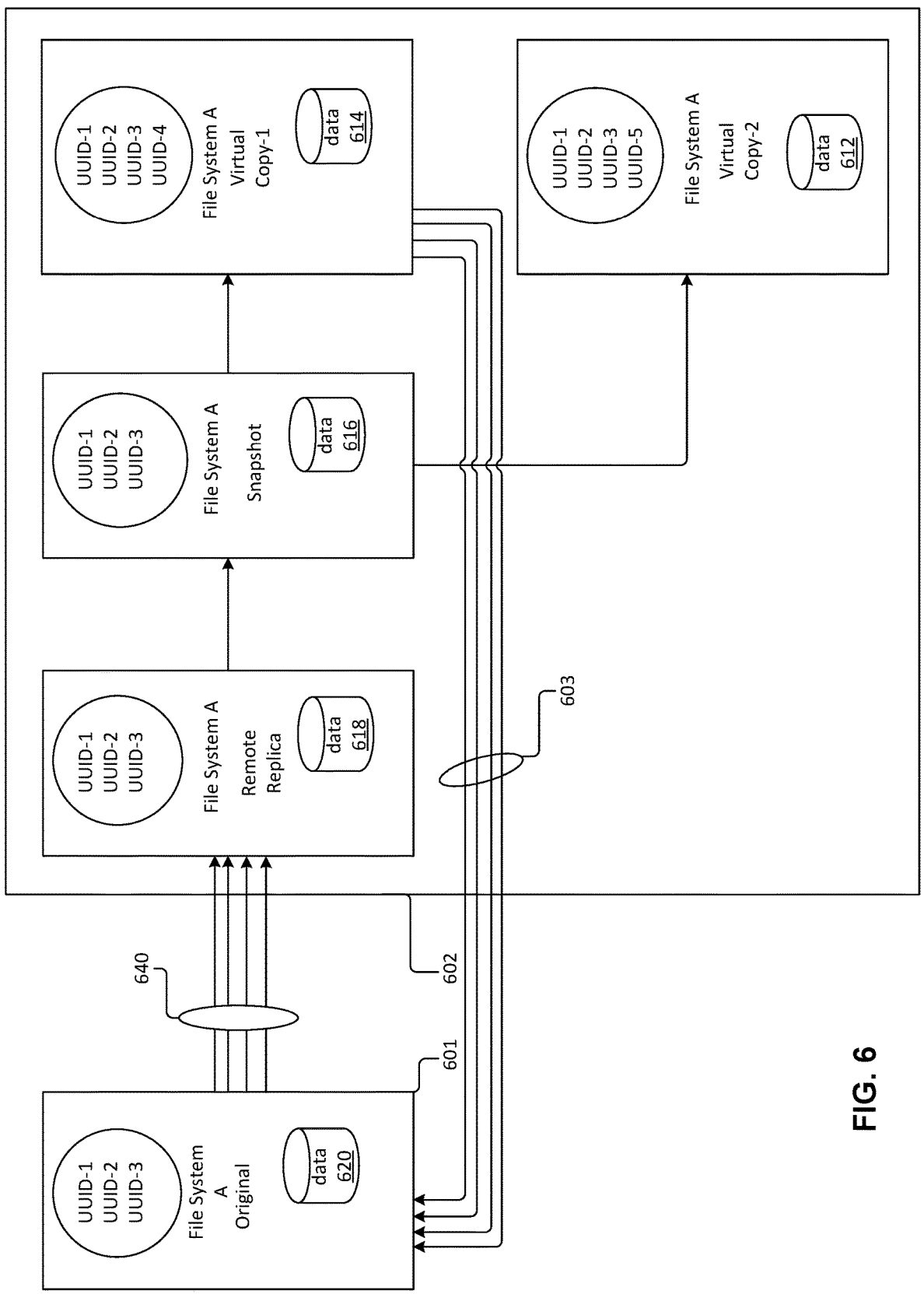
FIG. 6 shows a reverse synchronization to a prior version of a file system between file system storage nodes, in accordance with some embodiments.

FIG. 6 shows a reverse synchronization to a prior version of a file system between file system storage nodes 601 and 602, in accordance with some embodiments. Common file system operations for data include replication, snapshot, and clone. Any time data (metadata or content data) is moved across a local area network (LAN) or wide area network (WAN), minimizing data movement reduces resource usage and operational times. Data 620 from the node 601 is real-time parallelly replicated to the node 602 over a local area network or wide area network 640, and stored in the node 602 as replica 618. After the replica 618 is generated at the node 602, a snapshot 616 of the data is generated from the replica 618, and a clone or virtual-copy 614 is generated from the snapshot 616. The snapshot 616 and virtual-copies 614 and 612 may each be stored in the node 602. Each of the data 620, replica 618, snapshot 616, and clone 614 may exist on separate parallel file systems.

After the creation of the virtual-copy 614, if the data on the virtual-copy 614 of the node 602 changes but the data 620 of the node 601 is unchanged, then the changes may need to be propagated back to the node 601 from the clone 614 of the node 602. One technique includes merging the data. Merging the data from the clone 614 back to the data 620 of the node 601 can require a data comparison of most or all of the data 620 on the node 601 and the clone 614. The merging operation is time consuming, particularly if it is performed over a wide area network 640. As such, an efficient reverse synchronization may be performed.

To perform the efficient reverse parallel synchronization, differences between the parallel file systems at the nodes 601 and 602 which are from the same lineage may be determined. The data 620 on the node 601 and the real-time replica 618 of the node 602 should be identical. The difference between the replica 618 and the snapshot 616 may be defined as D1, and the difference between the snapshot 616 and the clone 614 may be defined as D2. A total difference of data which needs to be reconciled between the data 620 and the clone 614 may be determined by combining D1 and D2. The node 602 may determine the difference data defining the total difference and provide the difference data to the node 601 over the WAN 640. As such, less data is transferred than a merge where the entire clone 614 is transmitted. D1 and D2 may be determined using internal file system data structures which support data versioning.

If the data in node 601 is modified before the reverse synchronization is attempted, there are a couple of alternatives which can be performed. For example, if one or more files modified on the node 601 are different than one or more files modified in the combination of D1 and D2, then a non-conflicting merge can be performed. In another example, if one or more files modified on the node 601 overlap with at least one of the files modified in the combination of D1 and D2, then either the modification in the node 601 or the node 602 may be used for the reverse synchronization. The selection between the modifications in the node 601 or the node 602 may be determined programmatically, or by providing a user interface for user selection.

In some embodiments, a universally unique identifier (UUID) chain may be used to determine which nodes are descendants of other nodes. A flow might be required to perform a replication synchronization operation back to a preceding node. To allow this operation, the UUID Chain of the target node Virtual Copy-1 must be a complete subset of the source node Original. Each time a parallel file system is modified, a new UUID may be added to the UUID chain. In contrast, if a parallel file system is copied without modifications, then the original and the copy may have the same UUID chain, similar to when a snapshot is taken. New UUID numbers may be assigned across multiple copies of the parallel file system each time there is a modification.

For example, the data 620 is the Original and includes UUID-1, UUID-2, and UUID-3. The real-time replica 618 is an unmodified copy of data 620, and thus also includes the UUID-1, UUID-2, and UUID-3. The snapshot 616 is an unmodified snapshot of the replica 618, and thus also includes the UUID-1, UUID-2, and UUID-3. The clone 614 of the replica 618 is the Virtual Copy-1, and thus initially also includes the UUID-1, UUID-2, and UUID-3. The clone 614 is then modified, resulting in a new UUID-4 being added to the UUID chain of the clone 614. Another clone 602 of the replica 618 is generated as the Virtual Copy-2, which also initially includes the UUID-1, UUID-2, and UUID-3. The clone 602 is then modified after the modification of the clone 614, resulting in a new UUID-5 being added to the UUID chain of the clone 602.

It is possible to perform replication synchronization from the Virtual Copy-1 to the Original because because the UUID Chain of the Original (UUID-1, UUID-2, UUID-3) is a subset of the UUID Chain of the Virtual Copy-1 (UUID-1, UUID-2, UUID-3, UUID-4). After this reverse resynchronization occurs, the Original node is a copy of the Virtual Copy-1, and thus will be assigned the UUID chain from Virtual Copy-1 (UUID-1, UUID-2, UUID-3, UUID-4).

Once the replication synchronization completes, it is not possible to perform a standard resynchronization of the Virtual Copy-2 to the Original because the Original's UUID chain now includes UUID-4, which is not included in the UUID chain of the Virtual Copy-2.

Once the snapshot 616 is created from the real-time replica 618, any modification on data 620 may cause a new UUID to be added to the UUID chains of data 620 and replica 618. Hence, the UUID chains may become (UUID-1, UUID-2, UUID-3, UUID-6). Now when a comparison of the UUID chains of Virtual-copy-1 614 and Original 620 is performed, the UUID Chain of Original 620 (UUID-1, UUID-2, UUID-3, UUID-6) is not a subset of Virtual-copy-1 614 (UUID-1, UUID-2, UUID-3, UUID-4). Hence, a clean reverse synchronization cannot be performed. However, because Original 620's prior UUID chain (UUID-1, UUID-2, UUID-3) is a subset of Virtual-Copy-1 (UUID-1, UUID-2, UUID-3, UUID-4), possible merges may be performed as discussed above for alternative merges.

Parallel Real-Time Synchronization of Data Across Parallel File System Nodes

Figure 7:
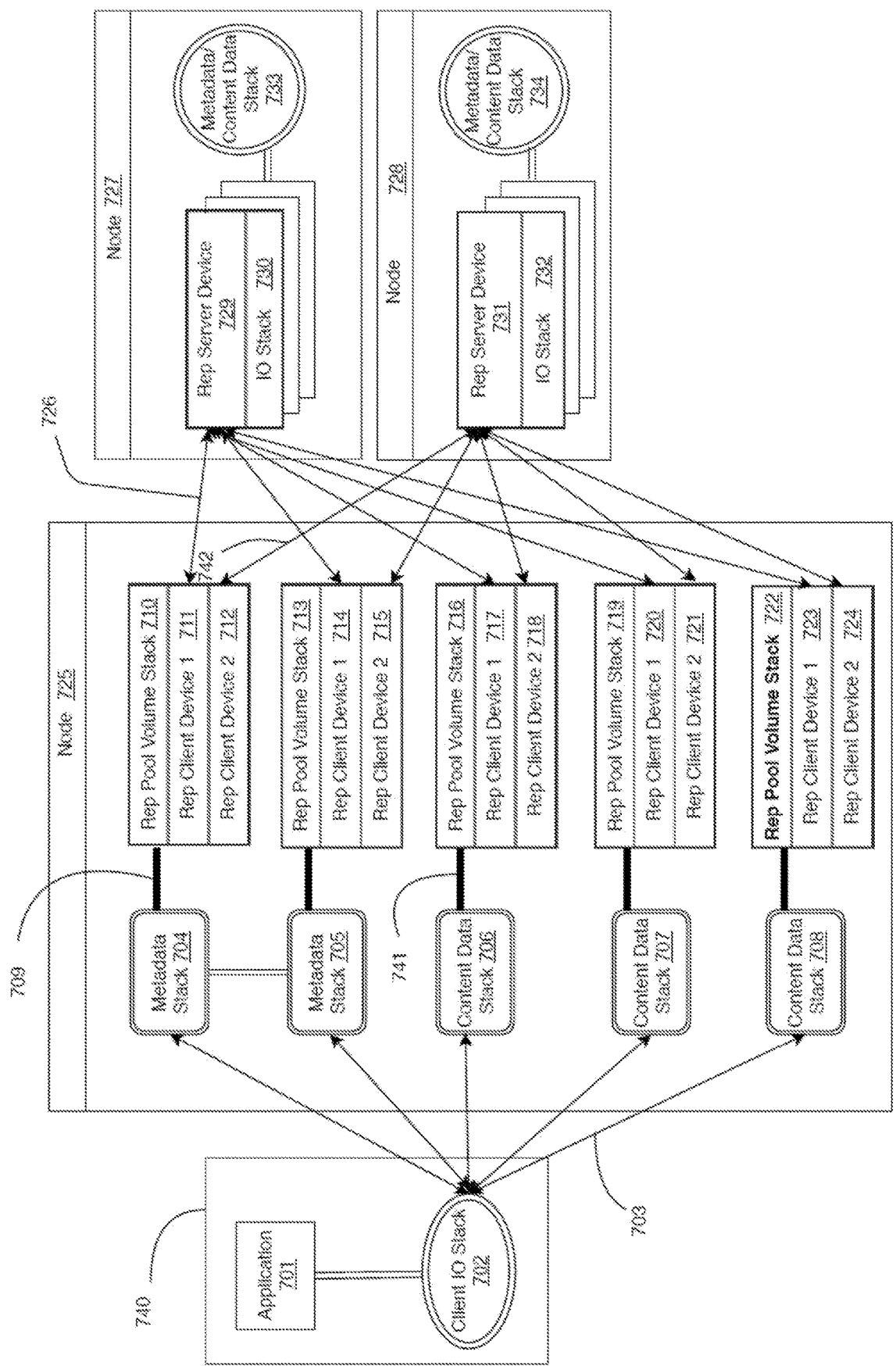
FIG. 7 shows a synchronization of data between file system storage nodes, in accordance with some embodiments.

FIG. 7 shows a synchronization of data between file system storage nodes 725, 727, and 728, in accordance with some embodiments. The file system storage cluster provides real-time synchronization of data across the parallel file system storage nodes. The cluster includes the node 725, the node 727, and the node 728, which are connected to each other via a WAN for synchronous communications. Rather than being restricted to a single region, the replication operates between multiple nodes at different regions connected over wide area networks.

The node 725 includes metadata stacks 704 and 705, content data stacks 706, 707, and 708, and replication pool volume stacks 710, 713, 716, 719, and 722. The node 725 is connected to a client IO stack 702, and the client IO stack 702 is connected to an application 701. The client IO stack 702 and application 701 reside in a single client device 740. There may be multiple such client devices attached to node 725. The client IO stack 702 includes an IO stack process that receives file system call events from application 701, and pushes the file system call events to the metadata stacks 704 and 705 and pushes the content data stacks 706, 707, and 708 of the node 725. The node may include various numbers of metadata and content data stacks.

Each metadata stack and content data stack of the node 725 is coupled via a connection link to a replication ("rep") pool volume stack that facilitates replication of the data of the file system at the node 725 to other nodes, such as the node 727 or node 728. For example, the metadata stack 704 is connected (e.g., via connection link 709) to a replication pool volume stack 710; the metadata stack 705 is connected to the replication pool volume stack 713; the content data stack 706 is connected (e.g., via connection link 741) to the replication pool volume stack 716; the content data stack 707 is connected to the replication pool volume stack 719; and the content data stack 708 is connected to the replication pool volume stack 722. Each of the other nodes 727 and 728 may be similar to the node 725. For example, each of the nodes 727 and 728 may include metadata and content data stacks 733/734, and replication pool volume stacks (not shown in FIG. 7) connected to the metadata and content data stacks 733/734. Each of the nodes 727 and 728 may also be connected to a client IO stack (similar to device 740) that is connected to an application to receive file system call events from the client device.

Each of the nodes may further include a replication server device, as shown by the replication service device 729 of the node 727 and the replication server device 802 of the node 728. The replication pool volume stacks of the node 725 execute threads/processes that manage communication to the remote nodes 727 and 728 through respective replication client devices. Each of the replication pool volume stacks may include one or more replication client devices, such as one replication client device for each connected remote nodes 727 and 728. For example, the replication client devices 1 (e.g., replication client device 711 or 717) are connected to the replication server device 729 of the node 727, and the replication client devices 2 (e.g., replication client device 711 or 717) are connected to the replication server device 731 of the node 728.

Each incoming file system event 703 from the client IO stack 702 to the node 725 is processed on a metadata or content data stack in parallel, based on the type of file system operation. Each file system operation may include one or more file system events. For example, a write operation may include an open file event, a write file event, and a close file event. The events processed by the metadata stacks 704 and 705 and content data stacks 706, 707, and 708 are pushed to the replication pool volume stacks 710, 713, 716, 719, 722. The replication pool volume stacks send the file system events in parallel to one or more remote nodes through the replication client devices connected to the nodes. The processes executed by the replication pool volume stacks provide synchronous or asynchronous data movement to remote nodes, such as based on the rule configuration of the source node. Each replication server device operates as a thread pool and can execute parallel tasks in the thread pool.

The replication client devices send event requests (e.g., requests 726 and 742) to the replication server device 729 of the node 727 and the replication server device 731 of the node 728. At each node, multiple instances of the replication server device may run in parallel to handle requests from multiple replication client devices. Replication server devices execute the events on metadata/content data stacks 733, 734 through their IO stacks 730 and 732, and return the execution status to the replication client device that sent the event request. If a transient execution error occurs at a replication server device, a request is resent from the replication client device to the replication server device for further processing. In the case of a permanent execution error, a response from replication client device is propagated back to the application 701.

Figure 8:
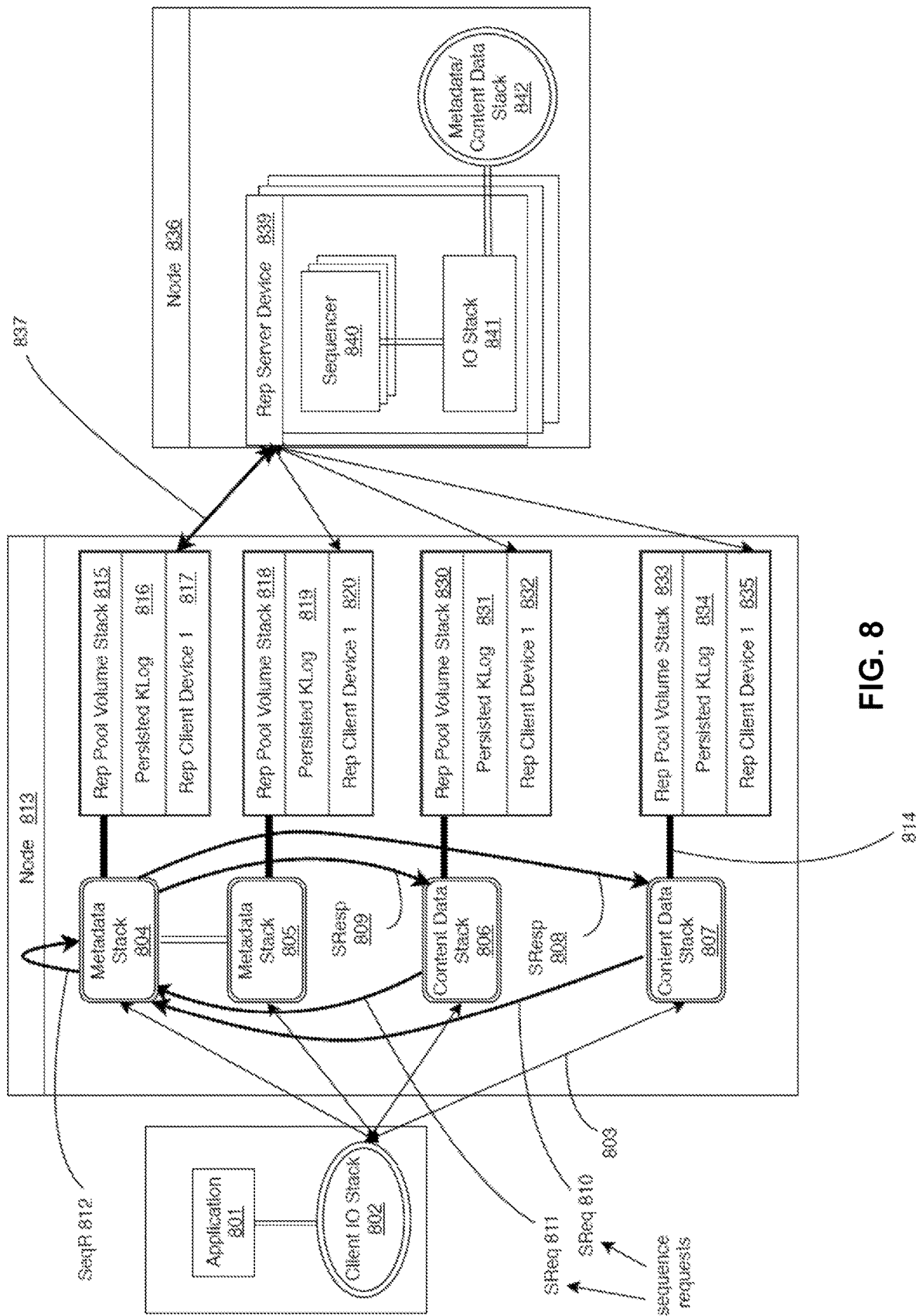
FIG. 8 shows a synchronization of data between file system storage nodes with high availability support, in accordance with some embodiments.

High Availability Support for Real-Time Synchronizing Data Across Parallel File System Storage Nodes FIG. 8 shows a synchronization of data between file system storage nodes 813 and 836 with high availability support, in accordance with some embodiments. Some examples of when high availability (HA) may be used include: (1) metadata/content data stacks or replication client/server devices fail; (2) metadata/content data stacks or replication client/server devices hang; (3) connectivity between nodes fail; or (4) storage space on a destination node is consumed or otherwise unavailable.

All of the above cases may use recovery mechanisms to make parallel file system nodes consistent. In order to meet high availability requirements of the parallel file system storage nodes, sequencing of file system events is performed. Both metadata and content data stacks use transactional file operations to order the received events. Node level sequencing in parallel creates global contention issues, and this is removed by using per-file level sequencing. Metadata stacks (e.g., metadata stack 804) generate sequence numbers 812 for the files and directories whose inode meta information is available within their own metadata stack.

Content data stacks 806 and 807 get their sequence numbers for their transactions by sending sequence requests (e.g., requests 810, 811) to their respective metadata stacks (e.g., metadata stack 804). Generated sequence numbers are returned (e.g., responses 809, 808) to the requester content data stack and cached. Per-file sequencing in turn creates cross-file dependency issues for operations, like rename, because multiple file system objects (file & directory) are involved. In order to solve this, a transactional ordered dependency chain (ordered locking) is created for all files involved in the operation. Dependency chain information and file operation event information along with a sequence number is appended to a persisted KLog. Each metadata/content data stack may hold its own Persisted KLog (e.g., persisted Klog 816 for metadata stack 804, and persisted Klog 831 for content data stack 806). This information is processed synchronously or asynchronously, based on the replication client device rule configuration. If the operation is synchronous, an inplace request will be triggered to the replication server device 839 of the node 836. Otherwise, a separate asynchronous thread handler performs a request trigger to replication server device 839. When the sequencer 840 of the node 836 receives Klog events from a replication client device 1 of the node 813, like replication client devices 817 or 832, a match is done with the prestored sequence number. Because metadata and content data operations for the same file are split across multiple processes, gaps can appear in a file's sequence on a replication server device since processes might process operations at different speeds. If there is a gap, the non-sequential file operation event is queued to a waiting list for later processing. The replication server device 839 executes all incoming events in order using the sequencer 840, and sends the response back to the sending replication client device of the node 813. If the execution response is a temporary error, the request is again sent for processing; otherwise, its corresponding transaction information is removed from the persisted Klog and status is returned to the application 801 through the IO Stack of the client IO stack 802.

Replication server devices which do not respond in a timely fashion or hang are considered aberrant and are remotely reset (STONITH), so they can return to normal operation.

Figure 9:
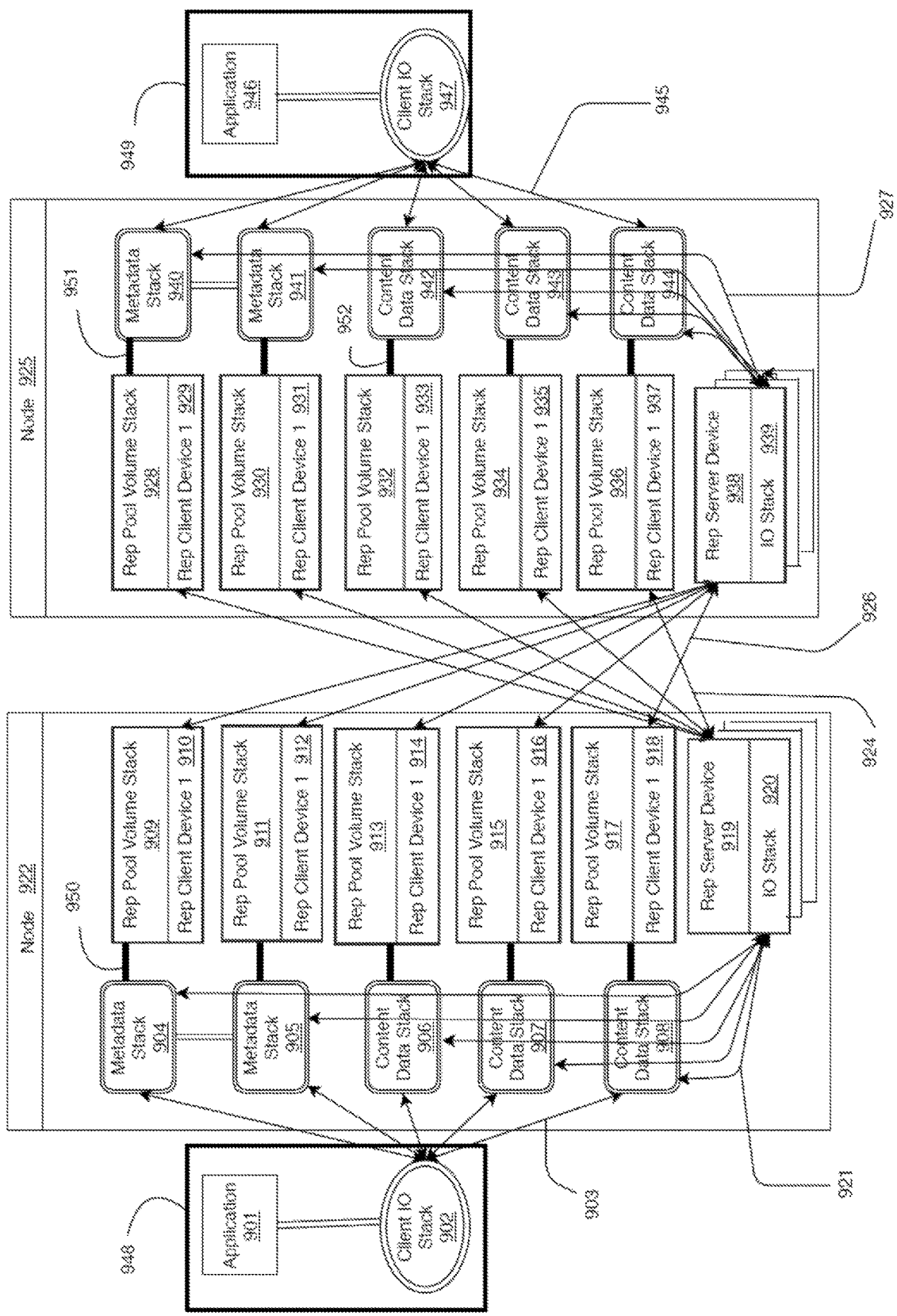
FIG. 9 shows a reverse synchronization of data between file system storage nodes, in accordance with some embodiments.

Reverse Path Real-Time Synchronization of Data Across Parallel File System Nodes FIG. 9 shows a reverse synchronization of data between file system storage nodes 922 and 925, in accordance with some embodiments. The client IO stack 902 traps file system call events from application 901, and pushes the events to the metadata stacks 904 and 905 and content data stacks 906, 907, and 908 of the node 922. The metadata stacks 904 and 905 and content data stacks 906, 907, and 908 execute the call events from the client IO stack 902, such as rename file or write data operation for the files stored at the cluster node 922, and forward those events to the cluster node 925 replication server device for execution. This process is referred to as the forward I/O path.

For a forward I/O path from the node 922 to the node 925, each metadata stack of the node 922 connects to a replication pool volume stack of the node 922. For example, the metadata stack 904 connects to a replication pool volume stack 909 via a connection link 950. Similarly, the metadata stack 905 connects to a replication pool volume stack 911. Each content data stack also connects to a replication pool volume stack. For example, the content data stack 906 connects to a replication pool volume stack 913; the content data stack 907 connects to a replication pool volume stack 915; and the content data stack 908 connects to a replication pool volume stack 917.

The replication pool volume stacks of the node 922 manage communication to a replication server device 938 of the node 925 through replication client devices 1, such as the replication client devices 910, 912, 914, 916, 918. The replication server device 938 provides the file system event calls from the node 922 to the metadata stacks 940 and 941 and content data stacks 942, 943, and 944 of the node 925.

A reverse I/O path refers to the reverse flow of file system call events from the node B to the node A with respect to A's forward I/O path, such as for a replication or caching operation.

The reverse I/O path follows a similar logic as the forward path I/O except that the reverse path I/O can create a looping issue. Without intermediation, a looping issue at metadata stack 940 may occur because IOs from rep server device 938 and IOs from client IO stack 947 must be handled differently. Forward path IOs from rep server device 938 terminate at metadata stack 940. Reverse path IOs from client IO stack 947 to metadata stack 940 must be sent to rep pool volume stack 928. The same looping issue may occur for the reverse IO path at metadata stack 941 and content data stacks 942, 943, and 944. As such, the metadata and content data stacks at the node 925 may include event differentiation logic to avoid this cluster looping issue. If the incoming event to a metadata stack 940 or 941 or content data stack 942, 943, or 944 is from the replication server device 938, then the event is not forwarded to any of the replication pool volume stacks 928, 930, 932, 934, or 936, thereby avoiding the looping issue.

Similarly, for the forward I/O path of the node 925, the client 947 includes an IO stack that traps file system call events from application 946, and pushes the events to the metadata stacks 940 and 941 and content data stacks 942, 943, and 944 of the node 925. The metadata stacks 940 and 941 and content data stacks 942, 943, and 944 execute the call events from the client 947, such as rename file or write data operation for the files stored at the node 925, and forward those events to the node 922 replication server device for execution.

For a forward I/O path from the node 925 to the node 922, each metadata stack of the node 925 connects to a replication pool volume stack. For example, the metadata stack 940 connects to a replication pool volume stack 928 via a connection link 951. Similarly, the metadata stack 941 connects to a replication pool volume stack 930. Each content data stack also connects to a replication pool volume stack. For example, the content data stack 942 connects to a replication pool volume stack 932 via a connection link 952; the content data stack 943 connects to a replication pool volume stack 934; and the content data stack 944 connects to a replication pool volume stack 936.

The replication pool volume stacks of the node 925 manage communication to a replication server device 919 of the node 922 through replication client devices 1, such as the replication client devices 929, 931, 933, 935, 937. The replication server device 919 provides the file system event calls from the node 925 to the metadata stacks 904 and 905 and the content data stacks 906, 907, and 908 of the node 922. To avoid cluster looping if the incoming event to a metadata stack 904 or 905 or content data stack 906, 907, or 908 is from the replication server device 919, then the event is not forwarded to any of the replication pool volume stacks 909, 911, 913, 915, or 917, thereby avoiding the looping issue.

Data/Network Optimizations

The nodes of a data mesh parallel file system cluster are connected via a local area network (LAN) or wide area network (WAN), such as the Internet. In some embodiments, the communications between nodes may include data/network optimizations such as encryption and decryption, compression and decompression, User Datagram Protocol (UDP) multiplex and UDP demultiplex, and forward error correction. One or more of the optimizations may be used.

Figure 10:
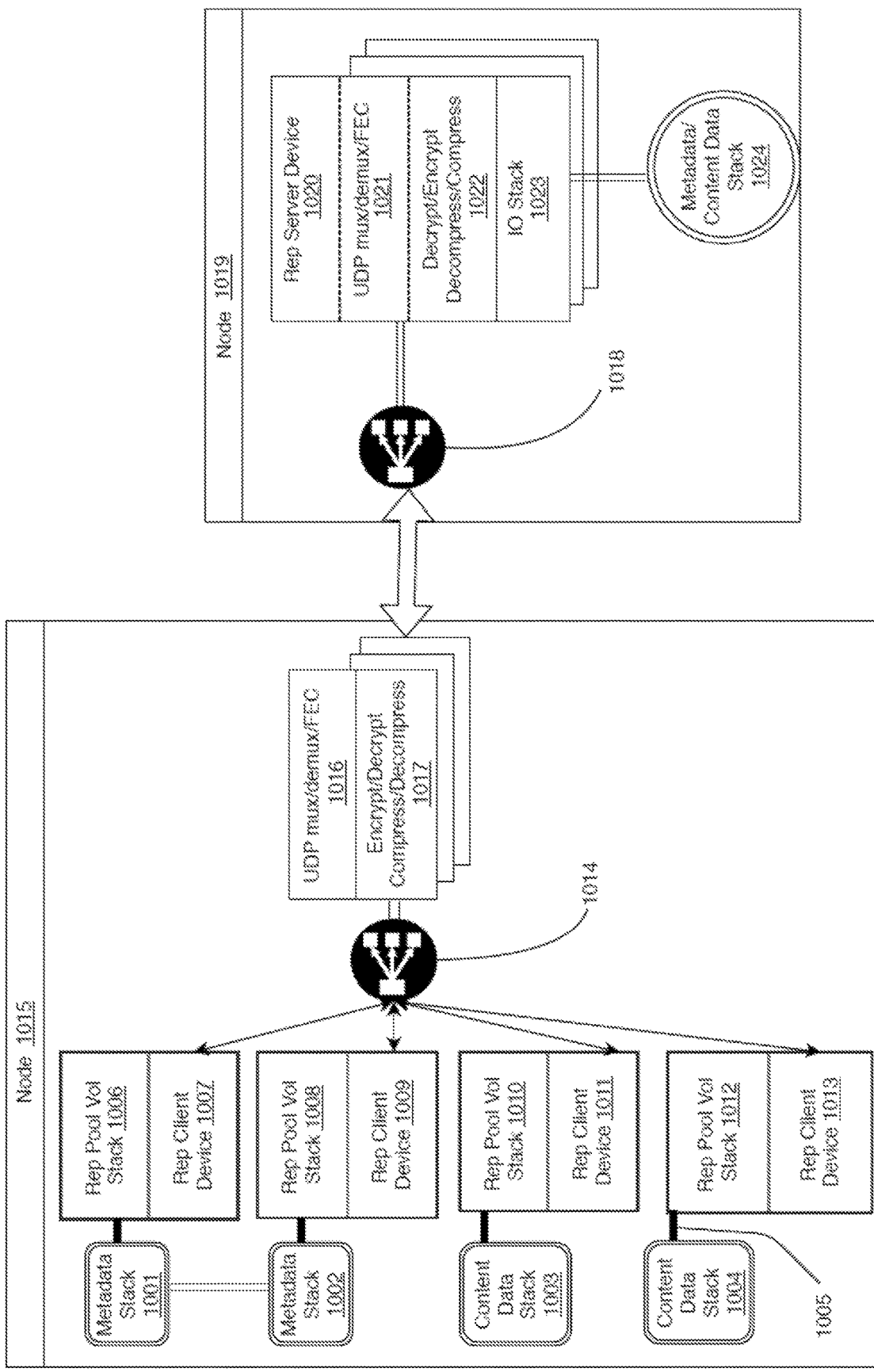
FIG. 10 shows a network connection between file system storage nodes, in accordance with some embodiments.

FIG. 10 shows a network connection between file system storage nodes 1015 and 1019, in accordance with some embodiments. The node 1015 includes metadata stacks 1001 and 1002 and content data stacks 1003 and 1004. Each metadata stack connects to a corresponding replication pool volume stack 1006 or 1008. Each content data stack 1003 and 1004 connects to a corresponding replication pool volume stack 1010 or 1012. The replication pool volume stacks of cluster node 1015 manage communication to the replication server device 1020 of cluster node 1019 through replication client devices, such as the replication client devices 1007, 1009, 1011, 1013. Node 1019 may include multiple instances of the replication server device 1020 executing in parallel to handle requests from the replication client devices of the node 1015.

The node 1015 may include transport optimized components to improve communication between the replication client devices of node 1015 and the replication server device 1020 of node 1019. The transport optimized components may include a UDP based multiplexing/demultiplexing with forward error correction component 1016, and an encryption/decryption and compression/decompression support component 1017. Multiple instances of the transport optimized components may execute in parallel. The cluster 1015 further includes a load balancer 1014 that connects the replication client devices to the transport optimized components 1016 and 1017. The load balancer 1014 includes logic to handle parallel events from the replication client devices. The UDP-based multiplexing/demultiplexing along with forward error correction provides an efficient and reliable transport mechanism against packet loss. The encryption/decryption and compression/decompression support component enhances the communication between clusters by adding security and reducing data size.

The node 1019 may include multiple instances of the replication server device 1020 which can be accessed in various ways. For example, the node 1019 may include a load balancer 1014 to handle events across all instances of the replication server device 1020. In another example, a particular instance of the replication server device 1020 may be selected based on a hash value computed from source file meta information.

The node 1019 may also include transport optimized stacks, such as a UDP-based multiplexing/demultiplexing with forward error correction component 1021, and an encryption/decryption and compression/decompression support component 1022. Events received by replication server device 1020 may be first handled by the UDP-based multiplexing/demultiplexing with forward error correction component 1021 and then the encryption/decryption and compression/decompression support component 1022. Events are then pushed to a sequencer (as shown in FIG. 8) where they are sequenced and then executed on a metadata/data stack 1024 through the IO stack 1023. For each event, the execution status is returned to the replication client device of the node 1015 that sent the event to the node 1019. In case of remote transient execution errors, a request is again queued for further processing; and in the case of a remote permanent execution error, a response is returned back to the application.

As such, file system event calls and associated data (e.g., data to write to a file) transmitted from one node to another node may be optimized. The optimization may include multiplexing, incorporation of error correcting code, encryption, and compression of data at the source node. The optimization may further include demultiplexing, error correction using the error correcting code, decryption, and decompression of the data at the receiver node. Load balancing at the source node may be used to receive data from multiple replication client devices that is transmitted over the LAN/WAN. Load balancing at the destination node may be used to distribute a received stream to the different instances of the replication server device.

Example Caching Process

FIG. 14 shows a flow chart of a method 1400 of data caching between file system storage nodes, in accordance with some embodiments. The method 1400 includes a caching process where a first file system storage node pulls data from a second file system storage node and makes the data available to the client device in response to a request from the client device. The caching process ensures that file systems stored in the first and second file storage nodes are synchronized on an as needed basis. The caching process of the file system storage nodes may be configured by a data orchestrator node connected to the file system storage nodes. The method 1400 may include fewer or additional steps, and steps may be performed in different orders.

The first file system storage node of a file system storage cluster receives 1405 a request from a client device to access data of a first file system. The client device may be connected to the first file system storage need via a network, such as a wide area network. The first file system may be stored at the first file system storage node, such as in a distributed manner across a plurality of servers. The first file system storage node makes data of the first file system available to client devices, such as by executing a file system service that handles requests from the client devices.

In response to the request to access the data, the first file system storage node pulls 1410 the data and nearby data of the data from the second file system storage node of the file system storage cluster. For example, if the requested data (or a latest update of the requested data) is not available at the first file system storage node, then the plurality of servers of the first file system node may pull the data from the second file system stored at the second file system storage node. The plurality of servers of the first file system may pull the data and the content data from another plurality of servers of the second file system in parallel. The first and second file systems share a global namespace.

The first and second file system storage nodes may be connected via a network, such as a wide area network (e.g., the Internet). To facilitate efficient network and node resource usage, only a portion of the second file system is pulled. For example, in addition to the data, nearby data to the data may be pulled in response to the request. In some embodiments, the first and second file system storage nodes may be connected via a local area network.

The data may include metadata or content data. The type of data may depend on the type of request from the client device. In an example where the data is metadata, the data may include metadata of a directory of the second file system and the nearby data may include one or more subdirectories of the directory, such as a predefined number of levels of subdirectories of the directory. In another example where the data is content data, the data includes content data of a file and the nearby data includes other content data that is contiguous to the content data or within an address space offset to an address space of the content data.

The first file system storage node stores 1415 the data and the nearby data in the first file system. For example, the plurality of servers of the first file storage system node may store the data and the nearby data in parallel.

The first file system storage node provides 1420 the data and the nearby data to the client device. Once stored at the first file system storage node, the data and nearby data is made available to the client device and other client devices, such as via a file system service.

In some embodiments, the first file system storage node receives a working set of data in parallel with the receiving the data and the nearby data. For example, the client device executes an application that generates the request to access the data. The working set of data is associated with the application and represents a larger set of data than the requested data and the nearby data of the requested data. The working set of data may include metadata or content data associated with the application. The data and the nearby data may have a higher priority than the working set of data along the network that connects the first and second file system storage nodes. This allows the more time sensitive requested data and nearby data to be quickly cached onto the first file system storage node while other data that may also be relevant are transferred in the background with remaining network resources.

In some embodiments, the first file system storage node continues to update the data to ensure synchronization with the first file system storage node. For example, the first file system storage node may pull a timestamp associated with the data from the second file system storage node at a time subsequent to pulling the data, and determine whether the timestamp is different from a prior timestamp of the data. In response to the timestamp being different from the prior time stamp, the first file system storage node may pull another instance of the data from the second file storage node.

Example Replication Process

FIG. 15 shows a flow chart of a method 1500 of data synchronization between file system storage nodes, in accordance with some embodiments. The method 1500 includes a replication process where updates to a file system storage node are replicated to a second file system storage node. The replication process ensures that file systems stored in the first and second file storage nodes are synchronized as updates occur in either file system storage node. The replication process of the file system storage nodes may be configured by a data orchestrator node connected to the file system storage nodes. The method 1500 may include fewer or additional steps, and steps may be performed in different orders.

The first file system storage node receives 1505 a request from a client device to write data to a first file system stored on the first file system storage node. The data may include metadata of a file or directory of the first file system, or content data of a file of the first file system.

In response to the request to write the data to the first file system, the first file system storage node writes 1510 the data to the first file system. For example, a plurality of servers of the first file system may write the data to the first file system in parallel.

The first file system storage node sends 1515 instructions to the second file system storage node for writing the data to a second file system stored in the second file system storage node. For example, the plurality of servers of the first file system may send the instructions to the second file system storage node in parallel. The first and second file systems may share a global namespace.

The second file system storage node writes 1520 the data to the second file system based on the instructions. For example, a plurality of servers of the second file system may write the data to the second file system in parallel. As such, the update in the first file system is replicated to the second file system.

In some embodiments, writing the data to the file system includes locking a file or object of the first file system, and the instructions sent to the second file system storage node include instructions to lock a corresponding file or object of the second file system. In another example, the locking is performed on multiple files or objects of the first file system having parent/child relationship, and the instructions sent to the second file system storage node include instructions to lock corresponding files or objects of the second file system having the parent/child relationship.

In some embodiments, writing the data to the file system includes the plurality of servers of the first file system storage node performing write operations according to an order. The instructions sent to the second file system storage node include instructions to perform corresponding write operations according to the order. In some embodiments, in response to an interruption while performing the corresponding write operations, the plurality of servers of the second file system storage node determines uncompleted write operations of the corresponding write operations, and performs the uncompleted write operations according to the order.

The replication of the method 1500 may include synchronous or asynchronous replication, as may be defined by the data orchestrator node. For a synchronous replication, the plurality of servers of the first file system may send the instructions to the second file system storage node prior to writing the data to the first file system. If the writing at the second file system storage node is successful, the second file system storage node sends an acknowledgement to the first file system storage node that the data has been written to the second file system. When the first file system storage node receives the acknowledgement, the plurality of servers of the first file system storage node writes the data to the first file system.

An asynchronous replication may be used to protect against a failure in the file system storage cluster, such as in a file system storage node or a network connection between two file system storage nodes. The instructions for writing the data are stored in a persistent data storage of the first file system storage node. If there is no failure in the file system storage cluster, then the plurality of servers of first file system storage node write the data to the first file system using the instructions stored in the persistent data storage and send the instructions stored in the persistent data storage to the second file system storage node in parallel with writing the data to the first file system. If there is a failure in the network, the plurality of servers of first file system storage node send the instructions stored in the persistent data storage to the second file system storage node when the network is reconnected. The data may be written to the first file system prior to the network being reconnected. If there is a failure in the first file system storage node, then the plurality of servers of first file system storage node may send the instructions stored in the persistent data storage to the second file system storage node when the first file system storage node is recovered. The data may also be written to the first file system when the first file system storage node is recovered, such as by using the instructions in the persistent data storage.

In some embodiments, a reverse replication may be performed where only differences in data at the second file system storage node are replicated to the first file system storage node. For example, the plurality of servers of the second file system storage node may generate a copy of the second file system, the copy including a third file system. In some embodiments, the copy may be generated from a snapshot of the second file system. The plurality of servers of the second file system may write additional data to the third file system. Subsequent to writing the data and in a reverse synchronization, the second file system storage node determines a difference between the third file system and the second file system. The second file system storage node sends instructions to the first file system storage node to update the first file system based on the difference between the third file system and the second file system.

Example Computer

Figure 16:
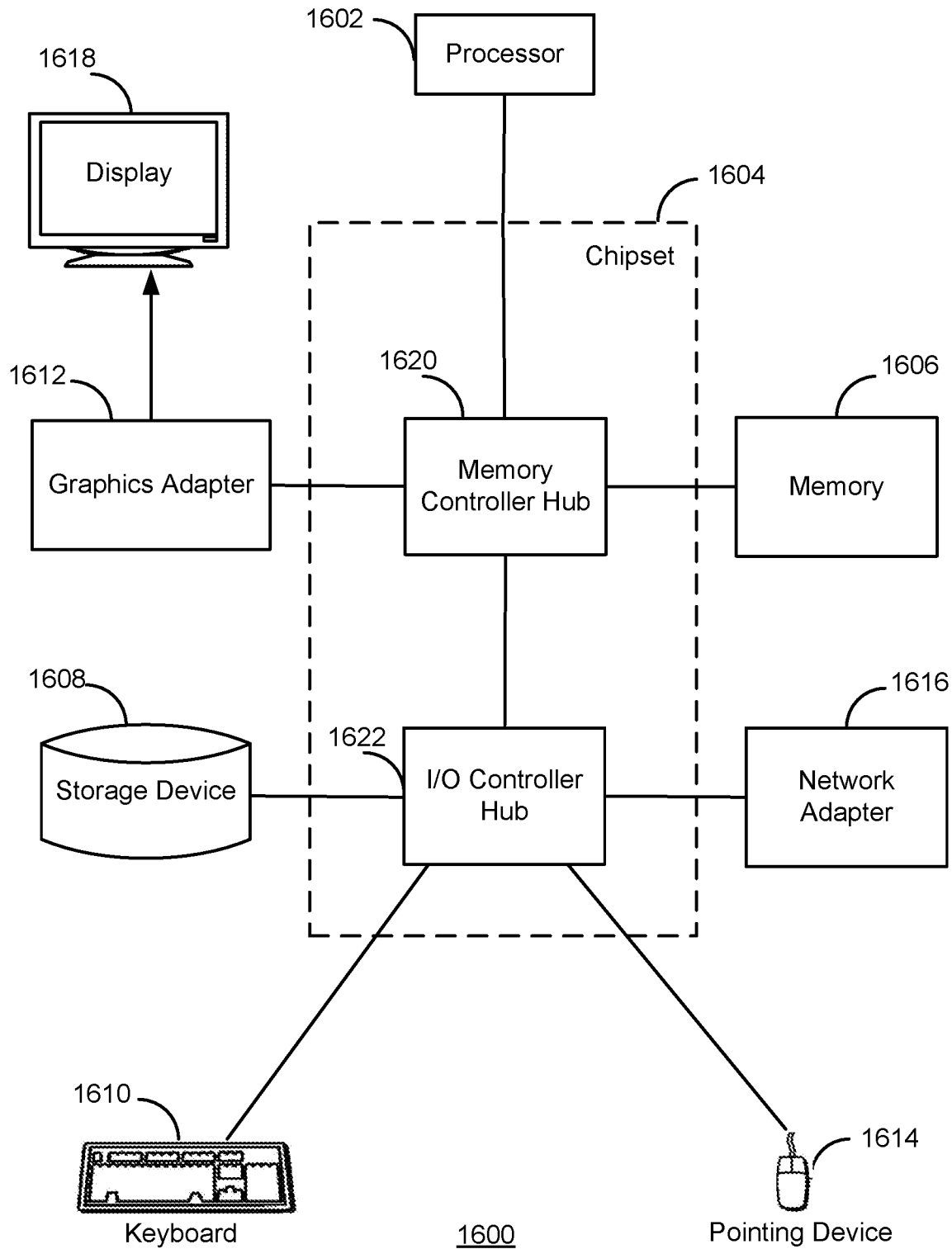
FIG. 16 shows a computer system, in accordance with some embodiments.

FIG. 16 is a schematic block diagram of a computer 1600, according to one embodiment. The computer 1600 is an example of circuitry that implements a file system storage node, such as a server of the file system storage node. Illustrated are at least one processor 1602 coupled to a chipset 1604. The chipset 1604 includes a memory controller hub 1620 and an input/output (I/O) controller hub 1622. A memory 1606 and a graphics adapter 1612 are coupled to the memory controller hub 1620, and a display device 1618 is coupled to the graphics adapter 1612. A storage device 1608, keyboard 1610, pointing device 1614, and network adapter 1616 are coupled to the I/O controller hub 1622. The computer 1600 may include various types of input or output devices. Other embodiments of the computer 1600 have different architectures. For example, the memory 1606 is directly coupled to the processor 1602 in some embodiments.

The storage device 1608 includes one or more non-transitory computer-readable storage media such as a hard drive, compact disk read-only memory (CD-ROM), DVD, or a solid-state memory device. The memory 1606 holds program code (comprised of one or more instructions) and data used by the processor 1602. The program code may correspond to the processing aspects described with FIGS. 1-15.

The pointing device 1614 is used in combination with the keyboard 1610 to input data into the computer system 1600. The graphics adapter 1612 displays images and other information on the display device 1618. In some embodiments, the display device 1618 includes a touch screen capability for receiving user input and selections. The network adapter 1616 couples the computer system 1600 to a network. Some embodiments of the computer 1600 have different and/or other components than those shown in FIG. 16.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method, comprising:
receiving, by a first file system storage node of a file system storage cluster, a request from a client device to access data, wherein the first file system storage node comprises: (a) at least one first metadata stack storing first metadata specifying location information of first content data, and (b) at least one first content data stack containing the first content data referenced by the at least one first metadata stack;

in response to the request to access the data, analyzing the at least one first metadata stack to determine, based on the location information, whether the data is available at the first file system storage node;
responsive to the determining that the data is not available at the first file system storage node:
pulling, by a plurality of servers of the first file system storage node in parallel, different partitions of the data from a second file system storage node of the file system storage cluster, wherein the second file system storage node comprises: (a) at least one second metadata stack storing second metadata specifying location information of second content data, and (b) at least one second content data stack containing the second content data referenced by the at least one second metadata stack,
wherein pulling, by the plurality of servers of the first file system storage node, the different partitions of the data from the second file system storage node comprises pulling, by the first content data stack, the different partitions of the data from the second content data stack,
wherein the plurality of servers pulling different non-overlapping partitions of the data in parallel comprises:
a first server, of the plurality of servers, pulling a first partition of the data from the second file system storage node;
concurrently with the first server pulling the first partition of the data from the second file system storage node: a second server, of the plurality of servers, pulling a second partition of the data from the second file system storage node;
wherein the first partition of the data is different than, and non-overlapping with, the second partition of the data; and
providing, by the plurality of servers of the first file system storage node, the data to the client device.

2. The method of claim 1, wherein the first file system storage node and the second file system storage node are connected via a wide area network.

3. The method of claim 1, wherein the first file system storage node and the second file system storage node are connected via a local area network.

4. The method of claim 1, further comprising, by a data orchestrator node connected to the first and second file system storage nodes, configuring the second file system storage node to replicate a change in the second file system storage node to the first file system storage node.

5. The method of claim 1, further comprising, by first file system storage node:
pulling a timestamp associated with the data from the second file system storage node at a time subsequent to pulling the data;
determining whether the timestamp is different from a prior timestamp of the data; and
in response to the timestamp being different from the prior time stamp, pulling another instance of the data from the second file system storage node.

6. The method of claim 1, further comprising:
in response to the request to access the data, pulling, by the plurality of servers of the first file system storage node in parallel, nearby data of the data from the second file system storage node of the file system storage cluster, wherein the nearby data is data that was not included in the request;
storing, by the plurality of servers of the first file system storage node in parallel, the different partitions of the data and the nearby data in the first file system storage node; and
providing, by the plurality of servers of the first file system storage node, the data and the nearby data to the client device.

7. The method of claim 6, wherein:
the data includes first metadata of a directory of the second file system storage node; and
the nearby data includes second metadata of a subdirectory of the directory.

8. The method of claim 7, wherein the second metadata includes a predefined number of levels of subdirectories of the directory.

9. The method of claim 6, wherein:
the data includes the first content data of a file of the second file system storage node;
the nearby data includes third content data of the file; and
the third content data is one of:
contiguous to the first content data; or
within an address space offset to an address space of the first content data.

10. The method of claim 6, wherein:
the client device executes an application that generates the request to access the data; and
the method further includes, by the first file system storage node:
receiving a working set of data associated with the application from the second file system storage node in parallel with receiving the data and the nearby data; and
providing the working set of data to the client device.

11. The method of claim 10, further comprising, by a data orchestrator node connected to the first and second file system storage nodes, configuring the second file system storage node to push the working set of data to the first file system storage node in parallel with the first file system storage node pulling the data and the nearby data.

12. The method of claim 10, wherein the working set of data includes metadata associated with the application.

13. The method of claim 10, wherein the working set of data includes content data associated with the application.

14. The method of claim 10, wherein:
the first file system storage node and the second file system storage node are connected via a network; and
the data and the nearby data has a higher priority than the working set of data along the network.

15. The method of claim 6, further comprising, by a data orchestrator node connected to the first and second file system storage nodes, configuring the first file system storage node to pull the data and nearby data from the second file system storage node in response to the request to access the data from the client device.

16. A system, comprising:
a first file system storage node comprising a plurality of servers, each server comprising a respective first processor coupled to a respective first memory,
wherein the first file system storage node further comprises: (a) at least one first metadata stack storing first metadata specifying location information of first content data, and (b) at least one first content data stack containing the first content data referenced by the at least one first metadata stack; and a second file system storage node comprising a second processor coupled to a second memory, the second file system storage node connected to the first file system storage node,
wherein the second file system storage node further comprises: (a) at least one second metadata stack storing second metadata specifying location information of second content data, and (b) at least one second content data stack containing the second content data referenced by the at least one second metadata stack;
the first file system storage node configured to:
  receive, by the first file system storage node, a request from a client device to access data;
  in response to the request to access the data, analyzing the at least one first metadata stack to determine, based on the location information of the first content data, whether the data is available at the first file system storage node;
  responsive to determining that the data is not available at the first file system storage node:
  pull, in parallel by a plurality of servers of the first file system storage node, different and non-overlapping partitions of the data from the second file system storage node;
    wherein pulling, by the plurality of servers of the first file system storage node, the different and non-overlapping partitions of the data from the second file system storage node comprises pulling, by the first content data stack, the different and non-overlapping partitions of the data from the second content data stack,
    wherein the plurality of servers pulling different and non-overlapping partitions of the data in parallel comprises: a first server, of the plurality of servers, pulling a first partition of the data from the second file system storage node;
    concurrently with the first server pulling the first partition of the data from the second file system storage node: a second server, of the plurality of servers, pulling a second partition of the data from the second file system storage node;
    wherein the first partition of the data is different than, and non-overlapping with, the second partition of the data; and
  provide, by the first file system storage node, the data to the client device.

17. The system of claim 16, wherein the first file system storage node and the second file system storage node are connected via a wide area network.

18. The system of claim 16, wherein the first file system storage node and the second file system storage node are connected via a local area network.

19. The system of claim 16, further comprising a data orchestrator node connected to the first and second file system storage nodes, the data orchestrator node configured to configure the first file system storage node to pull the data from the second file system storage node in response to the request, from the client device, to access the data.

20. The system of claim 16, further comprising a data orchestrator node connected to the first and second file system storage nodes, the data orchestrator node configured to configure the second file system storage node to replicate a change in the second file system storage node to the first file system storage node.

21. The system of claim 16, wherein the first file system storage node is further configured to:
  pull a timestamp associated with the data from the second file system storage node at a time subsequent to pulling the data;
  determine whether the timestamp is different from a prior timestamp of the data; and
  in response to the timestamp being different from the prior time stamp, pull another instance of the data from the second file system storage node.

22. The system of claim 16, wherein the first file system storage node and the second file system storage node are further configured to:
  in response to the request to access the data, pull, by the plurality of servers of the first file system storage node in parallel, nearby data of the data from the second file system storage node, wherein the nearby data is data that was not included in the request;
  store, by the plurality of servers of the first file system storage node in parallel, the different partitions of the data and the nearby data in the first file system storage node; and
  provide, by the first file system storage node, the data and the nearby data to the client device.

23. The system of claim 22, wherein:
the data includes first metadata of a directory of the second file system storage node; and
the nearby data includes second metadata of a subdirectory of the directory.

24. The system of claim 23, wherein the second metadata includes a predefined number of levels of subdirectories of the directory.

25. The system of claim 22, wherein:
the data includes the first content data of a file of the second file system storage node;
the nearby data includes third content data of the file; and
the third content data is one of:
  contiguous to the first content data; or
  within an address space offset to an address space of the first content data.

26. The system of claim 22, wherein:
the client device executes an application that generates the request to access the data; and
the plurality of servers of the first file system storage node is further configured to:
  receive a working set of data associated with the application from the second file system storage node in parallel with receiving the data and the nearby data; and
  provide the working set of data to the client device.

27. The system of claim 26, further comprising a data orchestrator node connected to the first and second file system storage nodes, the data orchestrator node configured to configure the second file system storage node to push the working set of data to the first file system storage node in parallel with the first file system storage node pulling the data and the nearby data.

28. The system of claim 26, wherein the working set of data includes metadata associated with the application.

29. The system of claim 26, wherein the working set of data includes content data associated with the application.

30. The system of claim 26, wherein:
the first file system storage node and the second file system storage node are connected via a network; and
the data and the nearby data have a higher priority than the working set of data along the network.

* * * * *